US010019442B2

(12) United States Patent
Nefedov et al.

(10) Patent No.: US 10,019,442 B2
(45) Date of Patent: Jul. 10, 2018

(54) METHOD AND SYSTEM FOR PEER DETECTION

(71) Applicant: Thomson Reuters Global Resources, Baar (CH)

(72) Inventors: Nikolai Nefedov, Gattikon (CH); Jan Waerniers, Aalter (BE); Ekaterina Suvorova, Hamden, CT (US); Brian Ulicny, Winchester, MA (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 253 days.

(21) Appl. No.: 14/726,561

(22) Filed: May 31, 2015

(65) Prior Publication Data

US 2016/0350294 A1 Dec. 1, 2016

(51) Int. Cl.
*G06F 17/30* (2006.01)
*G06Q 10/10* (2012.01)

(52) U.S. Cl.
CPC .... *G06F 17/30011* (2013.01); *G06F 17/3053* (2013.01); *G06F 17/30554* (2013.01); *G06F 17/30643* (2013.01); *G06F 17/30734* (2013.01); *G06F 17/30864* (2013.01); *G06Q 10/10* (2013.01)

(58) Field of Classification Search
CPC ......... G06F 17/30681; G06F 17/30265; G06F 17/30728; G06F 17/30011; G06F 17/301; G06F 17/30864; G06F 17/30687; G06F 17/30716; G06F 17/30643; G06F 17/30755; G06F 17/30769; G06F 17/30539; G06F 17/30663; G06F 17/3069
See application file for complete search history.

(56) References Cited

U.S. PATENT DOCUMENTS

| 6,922,700 | B1* | 7/2005 | Aggarwal | G06F 17/30321 |
| 7,814,107 | B1* | 10/2010 | Thirumalai | G06F 17/30011 |
| | | | | 707/749 |
| 8,015,183 | B2* | 9/2011 | Frank | G06F 17/30241 |
| | | | | 702/179 |
| 9,110,971 | B2* | 8/2015 | Liao | G06F 17/30616 |
| 2001/0044758 | A1* | 11/2001 | Talib | G06F 17/30622 |
| | | | | 705/26.1 |
| 2002/0022974 | A1* | 2/2002 | Lindh | G06F 17/30716 |
| | | | | 705/3 |
| 2003/0174179 | A1* | 9/2003 | Suermondt | G06F 17/30713 |
| | | | | 715/853 |
| 2005/0114324 | A1* | 5/2005 | Mayer | G06F 17/30864 |

(Continued)

FOREIGN PATENT DOCUMENTS

WO WO 2007/052883 * 5/2007
WO WO 2008/084979 * 7/2008

*Primary Examiner* — Srirama Channavajjala
(74) *Attorney, Agent, or Firm* — Duncan Galloway Egan Greenwald, PLLC; Kevin T. Duncan

(57) ABSTRACT

The present invention provides a method and system delivering graph-based metric to measure a similarity between weighted sets of classifications codes (presented as nodes) defined on hierarchical taxonomy trees. The suggested method is applied to find company peers in a particular domain, e.g., the IP domain based on a company patent portfolio. The suggested method may be applied to other domains that include hierarchical classifications such as trademarks, legal documents, scientific papers, lawsuits etc.

20 Claims, 27 Drawing Sheets

(56) References Cited

U.S. PATENT DOCUMENTS

| | | | | |
|---|---|---|---|---|
| 2006/0026013 | A1* | 2/2006 | Kraft | G06F 17/30867 |
| | | | | 705/1.1 |
| 2007/0073748 | A1* | 3/2007 | Barney | G06F 17/30675 |
| 2007/0106662 | A1* | 5/2007 | Kimbrough | G06F 17/30707 |
| 2007/0130123 | A1* | 6/2007 | Majumder | G06F 17/3069 |
| 2007/0174872 | A1* | 7/2007 | Jing | G06F 17/30244 |
| | | | | 725/46 |
| 2007/0185871 | A1* | 8/2007 | Canright | G06F 17/30864 |
| 2008/0189269 | A1* | 8/2008 | Olsen | G06F 17/30864 |
| 2008/0228724 | A1* | 9/2008 | Huang | G06F 17/30707 |
| 2009/0190839 | A1* | 7/2009 | Higgins | G06F 17/3069 |
| | | | | 382/209 |
| 2010/0125566 | A1* | 5/2010 | Gibbs | G06F 17/30634 |
| | | | | 707/722 |
| 2010/0198841 | A1* | 8/2010 | Parker | G06F 17/30887 |
| | | | | 707/750 |
| 2010/0332511 | A1* | 12/2010 | Stockton | G06F 17/30616 |
| | | | | 707/759 |

* cited by examiner

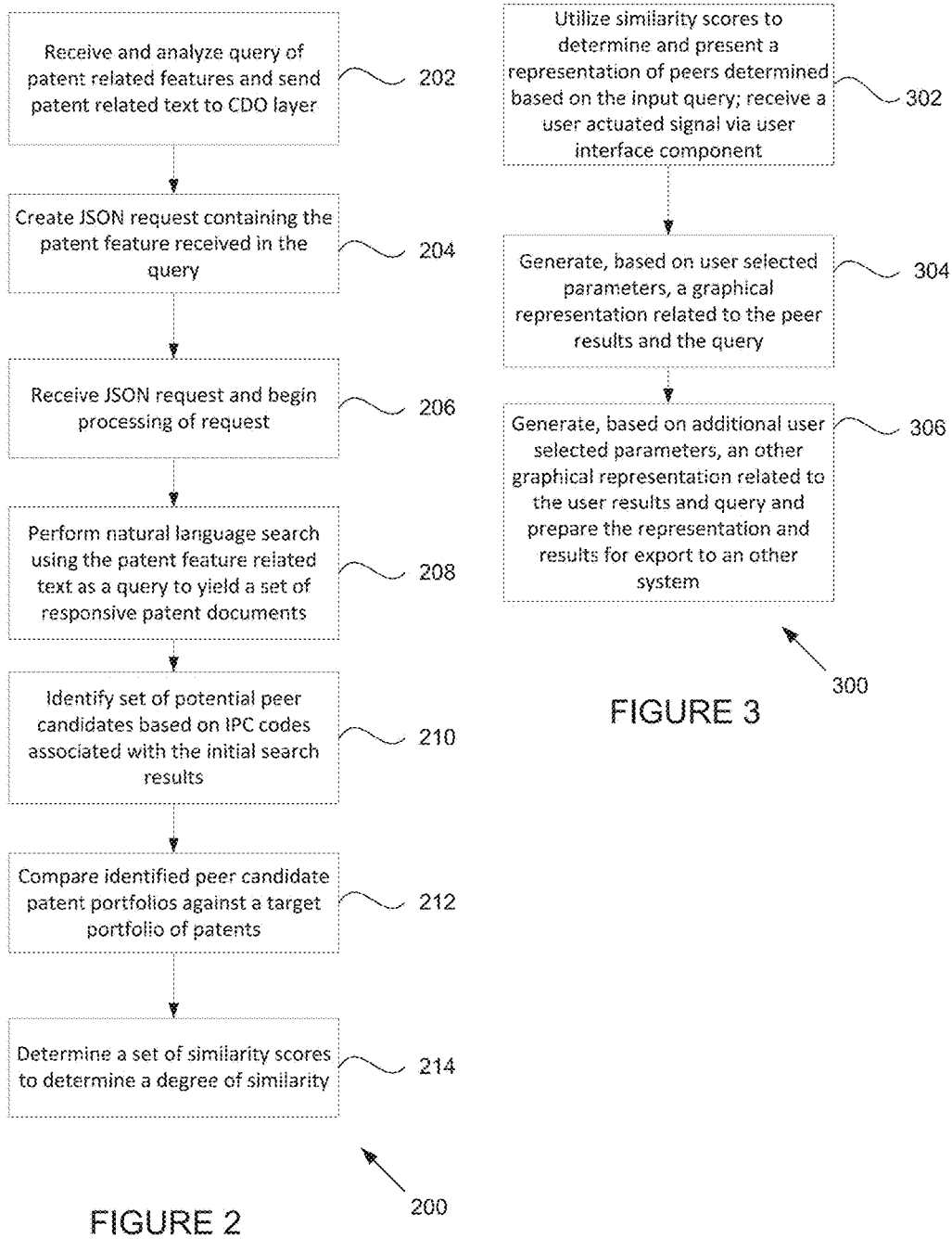

Peers of company B are { E, D, A, C }

Local view => pair-wise similarity between companies' portfolios (groups of IPC codes).

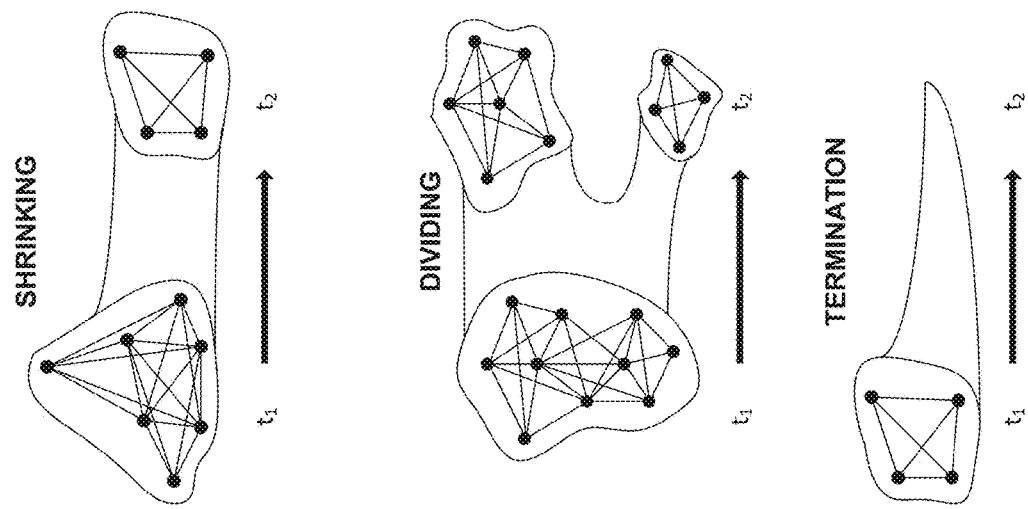
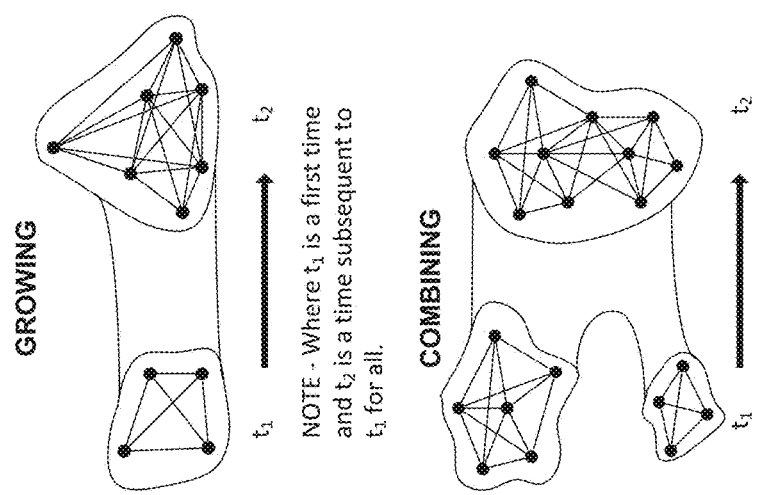
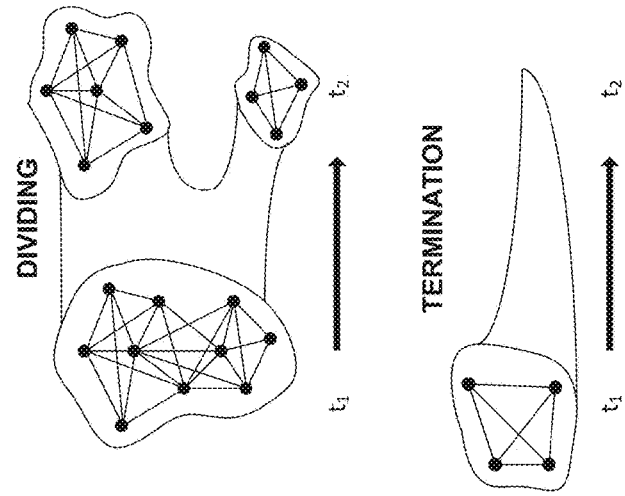
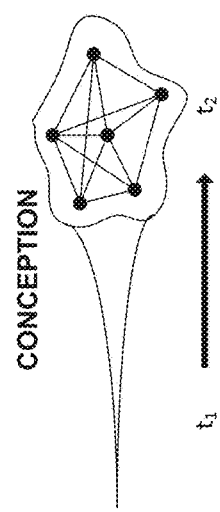
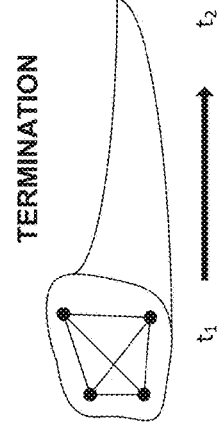
FIGURE 12

METHOD AND SYSTEM FOR PEER DETECTION

FIELD OF THE INVENTION

The present invention relates generally to information retrieval and more particularly to determining similarity of entities based on comparison of known assets, e.g., patents, trademarks, and other tangible and intangible things (including natural language processing). The invention relates to statistical weighting of terms or other aspects of documents, e.g., patents and metadata of patents (such as IPC codes and other fields), to determine how similar one set of documents is to another set of documents. More particularly, the invention relates to providing graph-based representation of complex data and data processing results to aid human users in a variety of activities, including delivery of services related to the legal, corporate, and other professional sectors. The invention relates to a system that presents searching functions to users, such as subscribers to a professional services related service, to search for peer entities and filtering functions to further process peer information.

BACKGROUND OF THE INVENTION

With the advents of computer-implemented data capturing and processing and mass data storage, the amount of information generated by mankind has risen dramatically and with an ever quickening pace. As a result there is a continuing and growing need to collect and store, identify, track, classify and to assimilate, transform and re-define this growing sea of information for heightened use by humans.

One traditional form of cataloging and classifying information is the Dewey Decimal System. In the area of patents, millions of patents have issued in the U.S. alone. Each patent is issued each with a common set of features, e.g., claims, IPC code, title, cited references, abstract, specification, etc. In addition to issued patents are the growing number of published patent applications that are now available for searching and reviewing. Each published patent application likewise contains fields of interest. The U.S. Patent Office uses a subject matter-based classification system to place submitted patent applications in technology centers, classes, and sub-classes of art to more efficiently handle the searching and granting, or denying, of patent claims. In addition a set of International Patent Codes further classifies patents and applications by subject matter, namely the WIPO has established a set of 70,000 or so IPC codes. Historically, examiners assigned to examine patent applications would consult "shoes," i.e., a box associated with a particular sub-class and containing collections of patents grouped together based on subject matter disclosed and claimed by previous inventors. Prior to electronic searching examiners would consult by hand the shoes in an effort to find prior art, this was very tedious, time-consuming, and inefficient. Electronic databases effectively place patent documents in electronic "shoes" for searching. Now the electronic documents are available for additional uses.

In many areas and industries, including the financial and legal sectors and areas of technology, for example, there are content and enhanced experience providers, such as The Thomson Reuters Corporation. Such providers identify, collect, analyze and process key data for use in generating content for consumption by professionals and others involved in the respective industries. Providers in the various sectors and industries continually look for products and services to provide subscribers, clients and other customers and for ways to distinguish their firms over the competition. Such provides strive to create and provide enhance tools, including search tools, to enable clients to more efficiently and effectively process information and make informed decisions.

For example, with advancements in technology and sophisticated approaches to searching across vast amounts of data and documents, e.g., database of issued patents, published patent applications, etc., professionals and other users increasingly rely on mathematical models and algorithms in making professional and business determinations. Existing methods for applying search terms across large databases of patent documents, for example, have room for considerable improvement as they frequently do not adequately focus on the key information of interest to yield a focused and well ranked set of documents to most closely match the expressed searching terms and data. Although such computer-based systems have shortcomings, there has been significant advancement over searching, identifying, filtering and grouping IP documents by hand, which is prohibitively time-intensive, costly, inefficient, and inconsistent.

Search engines are used to retrieve documents in response to user defined queries or search terms. To this end, search engines may compare the frequency of terms that appear in one document against the frequency of those terms as they appear in other documents within a database or network of databases. This aids the search engine in determining respective "importance" of the different terms within the document, and thus determining the best matching documents to the given query. One method for comparing terms appearing in a document against a collection of documents is called Term Frequency-Inverse Document Frequency (TFIDF). TFIDF assigns a weight as a statistical measure used to evaluate tile importance of a word to a document in a collection of documents or corpus. The relative "importance" of the word increases proportionally to the number of times or "frequency" such word appears in the document. The importance is offset or compared against the frequency of that word appearing in documents comprising the corpus. TFIDF is expressed as the log $(N/n(q))$ where q is the query term, N is the number of documents in the collection and $N(q)$ is the number of documents containing q. TFIDF and variations of this weighting scheme are typically used by search engines, such as Google, as a way to score and rank a document's relevance given a user query. Generally for each term included in a user query, the document may be ranked in relevance based on summing the scores associated with each term. The documents responsive to the user query may be ranked and presented to the user based on relevancy as well as other determining factors.

Incorporated by reference is U.S. Pat. Publ. 2011/0191310 (Liao et al.) entitled Method and System For Ranking Intellectual Property Documents Using Claim Analysis.

SUMMARY OF THE INVENTION

In one manner the invention relates to a system for processing search terms and applying search syntax across document databases to identify and return peer matches. The invention relates to a system that performs critical quantitative analysis, transforms and packages complex information for human use and interaction via graphical user interface. The invention provides a graph-based metric to measure a similarity between weighted sets of classifications codes (presented as nodes) defined on hierarchical taxonomy trees. In particular, the suggested method is applied to find company peers in the IP domain based on a company patent portfolio. The suggested method may be applied to other domains that include hierarchical classifications such as trademarks, legal documents, scientific papers, lawsuits, financial objects (e.g., funds, portfolios . . . ) etc. Different businesses have use cases where finding a group of similar companies (or other objects) is a goal. For example in the financial sector the invention may be used for investment and M&A purposes; in the IP area for IP portfolio comparison, and in tax and accounting similar companies for transfer pricing products.

Some features and benefits associated with various embodiments of the present invention include: mapping companies (IP domain) on a technology map; search database (e.g., patent) for peers with user-defined set of codes, e.g., IPC codes, or specific technology domain; index or other metric to characterize company patent portfolio concentration; company characterization (e.g., two-dimension mapping) based on portfolio concentration and portfolio size (to search peers within a user-defined range of portfolio_size/concentration); comparing patents (with multiple IPCs); clustering within a patent and partitioning within a given patent portfolio; high granularity IPC similarity measure; asymmetric peer measures; enhanced user interface (UI)/ user experience (UX); and sub-activities (subset, superset) selection for peers and asymmetric measure.

Advantages of the present invention include: comparison of items with hierarchical structures (measuring on a similarity scale), while current methods only allow binary comparison (discrete 0 or 1 measure); define normalized similarity measure between sets of weighted items (portfolios) which takes into account weights associated with different hierarchical levels; build a relations graph and use network analysis to find peers and to map peers on a technology map; significantly (by several orders) reduce computation complexity compared to the standard similarity methods (e.g., cosine similarity); a wide range of applications; and may be applied to compare sets of weighted ontologies.

The invention may use the structural properties of an ontology (e.g., hierarchical classifications of patents, trademarks, legal documents, scientific papers, citations etc) to identify object peers (e.g., company peers). In particular, in one manner of implementation the invention uses taxonomy as a tree and defines a similarity measure based on a distance on a graph. For example, a patent portfolio may be presented as a vector containing weighted patent classifications codes (IPC). Each IPC in turn is formed by groups of characters corresponding to different hierarchy levels. Then we link hierarchy levels to a function of graph distances and recursively calculate similarity between feature IPC vectors. It may be shown that the suggested similarity measure is more accurate and more scalable than other (non-graph) measures such as cosine-similarity. The invention allows comparison of portfolios with items classified similarly (measuring on a similarity scale) while current methods only allow exact comparison (discrete 0 or 1 measure).

The present invention may be used to generate a graph-based metric to measure a similarity between weighted sets of classifications codes (presented as nodes) defined on hierarchical taxonomy trees. In particular, the suggested method is applied to find company peers in the IP domain based on a company patent portfolio. The suggested method may be applied to other domains that include hierarchical classifications such as trademarks, legal documents, scientific papers, lawsuits etc. Different business units have use cases where finding a group of similar companies is a goal.

F&R for investment (e.g., Thomson Reuters Eikon) and M&A purposes; IP&S for IP portfolio comparison; TRTA similar companies for transfer pricing products (e.g., OneSource/Transfer pricing product).

The set of features may comprise one or more from the group consisting of: fields of a patent; patent title; patent abstract; patent IPC code; patent references; patent claims; rank-c, representing the lowest rank of any claim of a patent in the first set of candidate patents; sim(q(top_claims), p(top_claims), representing a highest similarity score between the query q (where query q is an object for which we are looking a peer p) and claims in a patent in the first set of candidate patents; sim(q(all_claims), p(all_claims)), representing a similarity score between the query and all the claims of a patent in the first set of candidate patents; sim(q(title), p(title)), representing a similarity score between the query and the title of a patent in the first set of candidate patents; sim(q(abstract), p(abstract)), representing a similarity score between the query and the abstract of a patent in the first set of candidate patents; sim(q(key), p(key)), representing a similarity score between key concepts of the query and a patent in the first set of patents; sim(key,title), representing a similarity score between the key concept of the query and the title of a patent in the first set of patents; sim(q(key), p(abstract)), representing a similarity score between the key concept of the query and the abstract of a patent in the first set of patents; sim(q(IPC_top), p(IPC_top) to quantify, as an example, IPC-overlaps at different hierarchy levels, representing a number of overlapping IPC codes between IPC codes of a patent in the first set of patents and the IPC codes of an initial high-ranking set of patents in the first set of patents; sim(q(cite), p(cite) in direct-Cite, representing the number of patents in the initial high-ranking set of patent documents that cite or are cited by a patent in the first set of patent documents. Also, the set of feature scores may be normalized and may include IPC-overlap, representing a function of the number of the overlapping IPC codes between the IPC codes patents in the first set of patent documents (e.g., company A patent portfolio) and the IPC codes of patents in a second set of patents (e.g., company B patent portfolio). The system may compute similarity scoring based on IPC code taxonomy including code adapted to define the score between two or more IPC codes, divide each IPC code to a plurality of hierarchical levels based on IPC code structure.

One embodiment of the invention provides an asymmetric measure approach having the following advantages: a user can use IPC hierarchical structure in patent similarity assessment, compare directly patent portfolios without intermediate aggregation, apply non-symmetric peer measures (super- and sub-activities), dynamically set threshold on different dimensions with visual feedback, replace/augment peer list by peer graph visualization, revealing structure, use patent structure view to select sub/super activity as query, explore evolution over time, and explore the companies in a specific domain. PDS Network allows comparing and merging information from different domains into an overall similarity measure. Dimensions might include patents, trademarks, products, lawsuits and others.

In a first embodiment, the invention provides a computer-based system for processing a user query to detect a set of peers and generate a graphical representation of detected peers responsive to the query. The system includes: a peer detection search engine executed by a computer in communication with at least one database, the peer detection search engine being adapted to receive a peer query and, based at least in part on the peer query, to search at least one corpus of documents contained in the at least one database, the peer detection search engine comprising: a feature extraction module adapted to extract data from files contained in the at least one corpus of documents, the extracted data related to content associated with documents; a portfolio comparison module adapted to determine a set of similarity scores based at least in part on a set of the extracted data; and a graphical interface generation module adapted to transform the set of similarity scores and generate and present on a remote user display a graphical representation of the transformed set of similarity scores for visual perception by a human user associated with the remote user display.

The system of this first embodiment may be further characterized with the following features and operations. The extracted data may include a hierarchical set of features and the portfolio comparison module may be adapted to determine the set of similarity scores based on a set of weights assigned, respectively, to the hierarchical set of features and to generate a set of feature vectors. The system may comprise a set of database object files, each object file comprising entity data, extracted data, classification code data, and a set of similarity scores. The extracted data may include a set of patent features and the peer detection search engine may be adapted to determine a first set of peer candidates, the portfolio comparison module may be adapted to generate for each of the first set of peer candidates a set of feature scores associated with the set of patent features. The portfolio comparison module may be adapted to rank the set of peer candidates based at least in part on the set of feature scores, and wherein one or more of the set of feature scores is normalized and/or wherein the set of patent features comprises one or more from the group consisting of: fields of a patent; patent title; patent abstract; patent IPC code; patent references; patent claims; rank-c, representing the lowest rank of any claim of a patent in the first set of candidate patents; sim(c,c), representing a highest similarity score between the query and claims in a patent in the first set of candidate patents; sim(c,cs), representing a similarity score between the query and all the claims of a patent in the first set of candidate patents; sim(c,title), representing a similarity score between the query and the title of a patent in the first set of candidate patents; sim(c,abstract), representing a similarity score between the query and the abstract of a patent in the first set of candidate patents; sim(key,key), representing a similarity score between key concepts of the query and a patent in the first set of patents; sim(key,title), representing a similarity score between the key concept of the query and the title of a patent in the first set of patents; sim(key,abstract), representing a similarity score between the key concept of the query and the abstract of a patent in the first set of patents; and IPC-overlap, representing a number of overlapping IPC codes between IPC codes of a patent in the first set of patents and the IPC codes of an initial high-ranking set of patents in the first set of patents. The set of patent features may include IPC-overlap, representing the number of the overlapping IPC codes between the IPC codes of a patent in the first set of patent documents, the system further adapted to compute IPC-overlap including code adapted to define the overlap score between two IPC codes, divide each IPC code to a plurality of levels based on IPC code structure, and wherein a first level overlap between two IPC codes results in a first score and a second level overlap between two IPC codes results in a second score. The portfolio comparison module may be adapted to determine a first set of similarity scores by calculating aggregated code data or determine a first set of similarity scores by determining a minimum path distance via root on a taxonomy tree between nodes at one or more hierarchical levels or determine a first set of similarity scores based on a number of shared hierarchy levels or a number of shared nodes excluding root or determine a first set of similarity scores based on stopping computations at a lowest matching level of shared nodes or shared hierarchy levels on a taxonomy tree or determine a first set of normalized similarity scores between at least two nodes at a given hierarchy level on a taxonomy tree or determine a first set of similarity scores based at least in part on a weighted path length from root to node on a taxonomy tree or determine portfolio concentration score data representing a measure of an identified company's concentration of resources in one or more technology domains. The determined portfolio concentration score data represents a measure of the identified company's activities based on patent classifications and may be transformed into a two-dimensional company characterization metric, wherein the two-dimensional company characterization metric includes a first portfolio concentration metric and a second portfolio volume metric. The portfolio comparison module may be adapted to determine a pair-wise similarity between nodes by mapping nodes from a set of portfolios to an underlying classification tree or adapted to determine a second set of similarity scores by performing a direct comparison of selected portfolio data or adapted to perform the direct comparison by comparing a first set of patent data associated with a first patent portfolio with a second set of patent data associated with a second patent portfolio. The first patent portfolio and the second patent portfolio may be determined based on a prior determined set of similarity scores calculated using a set of patent features.

In a second embodiment the present invention provides a computer-based method of processing a user query to detect a set of peers and generate a graphical representation of detected peers responsive to the query. The method comprises: receiving, by a peer detection search engine executed by a computer in communication with at least one database, a peer query and, based at least in part on the peer query, searching at least one corpus of documents contained in the at least one database; extracting, by a feature extraction module executed by the computer, data from files contained in the at least one corpus of documents, the extracted data related to content associated with documents; determining, by a portfolio comparison module executed by the computer, a set of similarity scores based at least in part on a set of the extracted data; and transforming, by a graphical interface generation module executed by the computer, the set of similarity scores and generating and presenting on a remote user display a graphical representation of the transformed set of similarity scores for visual perception by a human user associated with the remote user display.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 2 is a first portion of a search flow diagram illustrating an exemplary method of implementing the present invention;

FIG. 3 is a second portion of a search flow diagram illustrating an exemplary method of implementing the present invention.

FIG. 12 illustrates an exemplary set of scenarios of network evolution.

DETAILED DESCRIPTION OF THE INVENTION

Figure 1:
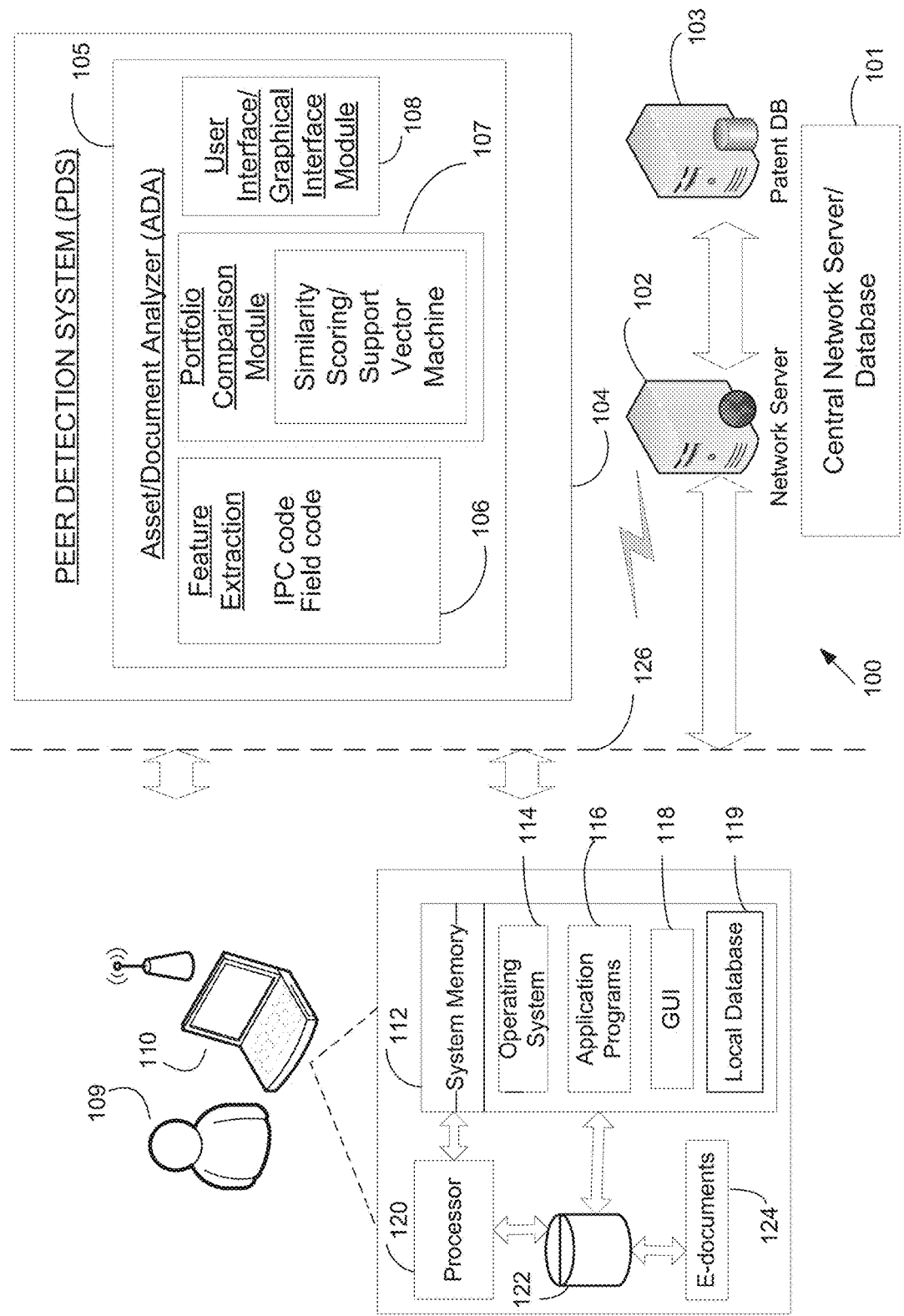
FIG. 1 is a schematic diagram illustrating an exemplary computer-based system for implementing the present invention.

The present invention will now be described in more detail with reference to exemplary embodiments as shown in the accompanying drawings. While the present invention is described herein with reference to the exemplary embodiments, and particularly with reference to peer detection by analysis of patent documents, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

"Patent documents," as that term is used in the specification, means U.S. and non-U.S. patents and published or laid open patent applications and also documents that are derived in whole or in part from such documents. For instance, U.S. patents include the following fields, features or terms, which may be separately defined searchable fields: Abstract; Application Date; Application Serial Number; Application Type; Assignee City; Assignee Country; Assignee Name; Assignee State; Assistant Examiner; Attorney or Agent; Claims; Description/Specification; Foreign Priority; Foreign References; Government Interest; International Classification or IPC code; Inventor City; Inventor Country; Inventor Name; Inventor State; Issue Date; Other References; Parent Case Information; Patent Number, Patent Type; PCT Information; Primary Examiner; Reissue Data; Title; Related US Application Data; Current US Classification; and Referenced By. Other regimes may use similar or additional fields that comprise patent documents. In addition, certain services have a proprietary classification system comprising one or more of fields, metadata, indices, tables, etc. containing information related to associated patent documents. The invention allows users to construct queries to include text for searching such databases. Users may also construct queries that include, in addition to the claim text query term, additional query terms to particularly limit or enhance importance of other terms such as those listed above. In this manner a user could, for example, search based on a company name to obtain a responsive set of patent documents to compare to those related to a peer "P" entity, e.g., a particular assignee, inventor, IPC or other classification, etc. In this manner the set of candidate patent documents yielded by the search engine used to process the queries may be reduced or particularized to suit the user's particular search needs or goals. In an alternative manner, the system may be configured to allow a user to delimit or weight certain patent related fields, such as those listed above.

In accordance with one implementation of the invention, the peer detection system compares patents owned by companies as a basis with which to determine patent similarity and, if sufficiently similar, detection of peers. This may be done with receiving a query from an interested user in which the query is a company or entity of interest. In other manners the query may be that of a feature of a patent, e.g., an IPC code or a set of IPC codes aggregated to a given hierarchy level accompanied with corresponding weights, for finding a set of companies having similar patents related to the IPC code (or a set of aggregated IPC codes) entered in the query. It should be understood that the invention is not limited to the patent domain or to determining similarity based on patent holdings or on IPC codes. The invention may be used to consider features of any of a number of assets owned by companies or company attributes of a class common in an industry, a geographic area, by country or sub-region, etc.

In this example of comparing patent holdings, the patents of a first company A, Portfolio A, and the patents of a second company B, Portfolio B, are considered as the candidate pool. In this example the user may enter a query q of terms including company A's name and may identify potential peers p, such as company B's name, or not. The list of potential peers P for detection based on query Q may be singular, i.e., of particular interest to the user, or may be less specific and numerous as candidates for peer status. For each patent or a group of patents in the candidate pool, a set of features is considered, compared, and a similarity scored. The example describes exemplary features any one or combination of which may be considered for computation. These features fully utilize different fields of a patent, such as title, abstract, IPC, references, and claims. These features may include some or all of the following exemplary fields: fields of a patent; patent title; patent abstract; patent IPC code; patent references; patent claims. In one manner, $sim(\_,\_)$, representing a similarity score between the query and feature(s) in patents included in the set of candidate patents. By way of example, $sim(a,b)$ represents the similarity of patents in portfolio A compared with portfolio B using some patent feature with which to base the similarity measure, e.g., IPC code. Sim $(q(IPC), p(IPC))$ represents a notation for similarity score between the query and the IPC code(s) associated with patents in the set of candidate patents. Alternatively, for example, $sim(q(claims\_all), p(claims\_all))$ may represent a similarity score between the query and all the claims of a patent in the set of candidate patents; $sim(q(title), p(title))$, representing a similarity score between the query and the title of a patent in the of candidate patents; $sim(q(abstract), p(abstract))$, representing a similarity score between the query and the abstract of a patent in the set of candidate patents; $sim(q(key), p(key))$, representing a similarity score between key concepts of the query and a patent in the set of patents; $sim(q(key), p(title))$, representing a similarity score between the key concept of the query and the title of a patent in the set of patents; $sim(p(key), q(abstract))$, representing a similarity score between the key concept of the query and the abstract of a patent in the set of patents; $sim(q(IPC\_top\_num), p(IPC\_top\_num))$ IPC-overlap, representing a number of overlapping IPC codes between IPC codes of a patent in the set of patents and the IPC codes of patents in the set of patents. The features described above may be fields associated with a classification or taxonomy or metadata related to the set of patents.

Normalization of similarity scores may also be used to further refine the results related to a query. For example, $sim(q(key), p(key))$ may represent the normalized similarity score between key concepts of patents in Portfolio A and those of Portfolio B. Often the beginning sentence of an independent claim contains words such as: comprising, consists of, including, herein and so on. These words, and words like them, are called identifiers. The words before an identifier usually point out the main subject of the claim, which may be referred to as a "key concept" The key concept of a patent may be defined as the key concept of the first claim of a patent. Where the set of patents does not have associated with it a defined structured data set or defined fields in a database or table, a separate search engine using language processing techniques may be used to identify features appearing with the text of a patent or a text segment, e.g., claims, specification, title, abstract, of a patent. From that the peer detection system may employ such techniques to extract features of interest for use in determining peer detection.

The present invention may be configured to provide network presentation: it allows comparing and merging information from different domains into an overall similarity measure; dimensions might include patents, trademarks, products, lawsuits and others; 3) analysis of temporal evolution of patent portfolio and peers could be performed by capturing the similarity measures as point-in-time data; 4) similarity measures could be used in a prediction model on merger/acquisition activities.

Another exemplary term is IPC-overlap. The IPC-overlap feature is based on the number of the overlapping IPCs, for example between the IPCs of patents in Portfolio A and those of Portfolio B or of a set of other source patents, which, for example, may include a more comprehensive set of patents in the candidate pool including those of any number of potential peer matches. This may be done by known companies in an industry or it may be done by starting with an IPC of known interest, for example, and determining additional IPCs that have overlapping subject matter of interest. One manner of computing IPC-overlap involves determining overlap score (or a function of it) between two or more IPCs, including different hierarchical levels. In one exemplary instance, each IPC may be divided into three levels based on known hierarchical structure. For example, an IPC like A61K / 009=02 has three levels A61K (level 1), A61K-009 (level 2), and A61K / 009=02 (level 3). A single-level overlap between two IPCs gives a predefined score of, for example, 0.3. The overlap scores of two IPCs may be defined as the sum of the scores from the three levels. For example, the overlap scores (without normalization) between A61K / 009=02 and A61K / 009=10 is 0.6 since they overlap at level 1 and level 2. The IPC overlap of patents in Portfolio A may be defined as the average overlap scores between the IPCs of Portfolio A and all the IPCs of the patents of Portfolio B or another set of candidate patents. This feature is based on the assumption that the IPCs shared by most of the source patents will reflect the topic of the query. Thus if a patent has a low IPC-overlap score, it is unlikely to be a similar patent to those of Portfolio A.

The assigned international patent code (IPC) and cited patents contain rich information about a particular patent. In one manner the peer detection system may initially employ a set of rules to determine relevance of candidate patents pcand to a target patent, e.g., a patent of company A, which may be deemed ptarget. First, if pcand's IPC matches (or has non-zero similarity taking into account hierarchical structure) with the IPC of the ptarget, and cites or is cited by ptarget, then pcand is similar to the ptarget, and is assigned a graded match or is simply placed in a first pool. Second, if pcand's IPC matches (or has non-zero similarity) with the IPC of the ptarget, but is neither cited by nor cites ptarget, then pcand is considered somewhat less similar to the ptarget, and is assigned a lower graded match or placed in a separate pool. Third, if pcand's IPC does not match (has no similarity) the IPC of the ptarget, and is neither cited by nor cites ptarget, then p is judged significantly less similar to the ptarget, and is assigned a lower grade or placed in a separate pool. As described below, peer detection by comparing patent portfolios of companies of interest and potential candidate peers may be done based on IPC codes the aggregated to a given hierarchy or using IPC codes specified in patents (direct patents comparison) which may include asymmetric measures as described below. In one manner, a company of interest may be analyzed to produce a fingerprint or DNA based on patent holdings and then compared against the fingerprint or DNA of other companies to arrive at a cluster of like or similar entities. For example, users in the financial services field may use the invention to analyze a company of interest and define industry segments as a collection or cluster of peers. The invention may be used to determine sets of IPCs within a given industry of interest by first broadly considering patent holdings of companies within an industry or market segment and then the user may drill down into results to examine in a more focused manner the entities making up the cluster. Moreover, to assist human users in this endeavor, the invention may present graphical user interface representations to allow the user to more readily visualize and experience the relatedness of companies and to selectively drill down into areas of interest for selective observation.

Based on the World Intellectual Property Organization, the IPC (international patent code) are distributed into eight sections. If, for example, all the patents in Section-A part of the IPC are used as the search space for detecting potential peers, the set of patents would be about half a million patents. To avoid computational expense and delay in yielding results, the invention does not require the use of the full text of a patent and rather may use the IPC code (or a set of IPCs) alone or in connection with the title, abstract, and claims of patents and other known fields.

The inventive method uses a rich set of features. Although certain exemplary features, e.g., IPC and IPC-overlap, are discussed in describing the present invention, one of ordinary skill in the art would not so limit the invention to these expressed features and would understand the use of the invention with additional features to yield beneficial results. For instance, one could apply other encoding of these features and could employ features based on distance metrics between IPCs.

With reference to FIG. 1, the above processes, and as discussed in more detail below, may be carried out in conjunction with the combination of hardware and software and communications networking illustrated in the form of exemplary system 100. In this example, system 100 provides a framework for searching, retrieving, analyzing, and comparing patent documents or patent features. Peer Detection System (PDS) 100 may be used in conjunction with a system offering of a professional services provider, e.g., Eikon, a part of Thomson Reuters Corporation, and in this example includes a Central Network Server/Database Facility 101 comprising a Network Server 102, a Search/Database 103 of patent documents, e.g., USPTO database, NOVUS distributed search engine offered by Thomson Reuters Corporation, a Peer Detection Search Engine (PDSE) 104 having as components a Patent/Asset Analyzer 105, a Feature Extraction module 106, a Patent/Portfolio Comparison module 107 and a User Interface/Graphical Interface Module 108. The Central Facility 101 may be accessed by remote users 109, such as via a network 126, e.g., Internet. Aspects of the system 100 may be enabled using any combination of Internet or (World Wide) WEB-based, desktop-based, or application WEB-enabled components. The remote user system 109 in this example includes a GUI interface operated via a computer 110, such as a PC computer or the like, that may comprise a typical combination of hardware and software including, as shown in respect to computer 110, system memory 112, operating system 114, application programs 116, graphical user interface (GUI) 118, processor 120, and storage 122 which may contain electronic information 124 such as electronic documents. The methods and systems of the present invention, described in detail hereafter, may be employed in providing remote users access to a searchable database. In particular, remote users may search a patent document database using search queries based on patent numbers, IPC codes, and company name to retrieve and view patent documents of interest and to selectively query the PDSE for peer companies related to the input query comprising a company name, and IPC code, or a patent number, for example. Because the volume of patent documents is quite high, the invention provides similarity scoring processes that facilitate an efficient and highly effective, and much improved, searching operation. Client side application software may be stored on machine-readable medium and comprising instructions executed, for example, by the processor 120 of computer 110, and presentation of web-based interface screens facilitate the interaction between user system 109 and central system 101. The operating system 114 should be suitable for use with the system 101 and browser functionality described herein, for example, Microsoft Windows operating systems commonly available and widely distributed. The system may require the remote user or client machines to be compatible with minimum threshold levels of processing capabilities, minimal memory levels and other parameters.

The configuration thus described in this example is one of many and is not limiting as to the invention. Central system 101 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 101 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 8I™, 10G™, or some other suitable database application may be used to manage the data. These tables may be organized into an RDS or Object Relational Data Schema (ORDS), as is known in the art.

FIGS. 2 and 3 illustrate an exemplary Patent/Asset Analyzer 105 as a java-based vertical system 200 that accepts queries from a remote user 109 operating remote client device 110. For example, the PAA 105 may receive as input a query Q comprising a set of query terms T, the terms may include one or more of IPC code, patent number, patent features, text related to patent features, identifying indicia to indicate particular features to which the terms relate. The PAA 105 processes the query to identify and retrieve a set of responsive results, e.g., set of potential peers or matching patent documents, comprising entities similar to the input company or entities or patents similar to the input patent, IPC code, and/or other patent feature. At Step 202 a user, such as an Eikon (a Thomson Reuters service) subscriber, enters or selects patent related features to analyze. Based on the query input, the UI (User Interface) layer sends the patent related text to the CDO (Collaboration Data Objects) layer. At Step 204, the CDO layer creates a JSON (JavaScript Object Notation) request containing the patent feature received in the query, and submits it to the vertical via an HTTP POST request. To be clear, this particular manner of handling an input search is merely exemplary and the invention is not limited in any way to this approach.

At Step 206, a controller receives the request, and initiates processing. At Step 208, an optional initial natural language search may be performed, e.g., using the patent feature related text as a query, against the patent database to yield a set of responsive patent documents. Note that the optional initial search step may be useful in situations where the patent documents are not structured documents or with which objects, tables, etc. are not associated with patents having separately searchable fields, e.g., IPC code fields. From the set of relevant results, the system may then identify IPC codes present in the search results from which to base further processing.

For example, a user may input a company name and a set of text terms with an indicia, such as title, of which the user is aware relates to the company of interest, e.g., the query may be "Microsoft & ttl(software)." Using this exemplary query, the user is interested in finding a set of peers having patent portfolios similar to Microsoft in the area of "software." In this example Microsoft is the target company and its portfolio of patents having "software" in the title is the target patent portfolio. The search is broadly structured and involves searching for Microsoft patents having "software" in the title. Initially the PDSE may identify a set of patents owned by Microsoft that include the term "software" in the title of the invention. Based on this information, the PDSE may, in one exemplary manner, next identify a set of IPC codes extracted from or associated with the resulting Microsoft "software" patents. Next, at step 210, the PDSE 104 may use one or more IPC code(s) associated with the initial search results to identify potential peer candidates, i.e., companies having patents that match to some degree the IPC code of interest.

At step 212 the PDSE is used to compare the patent portfolios of the identified peer candidates against the portfolio of "software" related patents held by Microsoft. In addition, the PDSE may broaden the set of Microsoft patents by using the IPC codes identified in the initial search process and using that to find additional Microsoft patents that do not have "software" in the title but that do match the IPC code at some level. The PDSE may then at step 214, determine a set of similarity scores to determine the degree of similarity between a set of peers and Microsoft.

FIG. 3 is a flow chart representing an exemplary set of steps that define an exemplary graphical interface process 300 performed by the PDS 104. At step 302 the PDS uses the similarity scores obtained, e.g., by the process of FIG. 2, and determines and presents to the user a representation of peers determined based on the input query of the user. At step 304 the user may, by way of user interface components, selectively request a form of graphical presentation related to the peer results and the query. In the alternative, the PDS may present a default graphical interface for display to the user via the remote device. The graphical interface may, for example, include the entity of interest included in the search, e.g., Microsoft, with textual or other accompanying notation, along with the set of identified peers. The peers may be indicated by name or by cluster of similar patents owned by each respective peer entity and may be shown with connecting lines or the like to graphically depict similarity. The graphical representation of peers may include indicia indicative of degree of similarity. The visualization may be presented in the form of a network of connected nodes representing similarity between nodes, which may represent entities or IPCs.

At step 304 the user may selectively actuate a user interface component displayed on the graphical representation to direct the PDS for some further action. For example, the user may select a patent as graphically displayed (e.g., by IPC code) to obtain information about the patent selected or to redefine the search in some manner. For example, the user may be presented with a comprehensive set of patents, grouped into clusters, owned by Microsoft and, based on the visualization of the cluster, select an IPC or grouping from which to search for peers. For example, and as discussed in detail below, the IPC may include subactivities and superactivities related to Microsoft's patent portfolio and, hence, its business. The user may use the graphical interface to focus on finding peers in related subactivities or to broaden out to peers in superactivities.

At step 306, the user may direct the PDS to present a different form of graphical representation of peer information, e.g., in bar form, in 3-dimensional form, in quadrants, in clusters, etc. The user may separately request the PDS to present underlying scoring data as a quantification of peer similarity as scored. The user may then, through the PDS, redirect to another system, either integrated with the PDS or separate from the PDS, to carry out additional activities upon receiving and viewing the peer detection results. For example, the user may use the information in a report, in determining valuation, in determining probability of some further event, etc.

Figure 4:
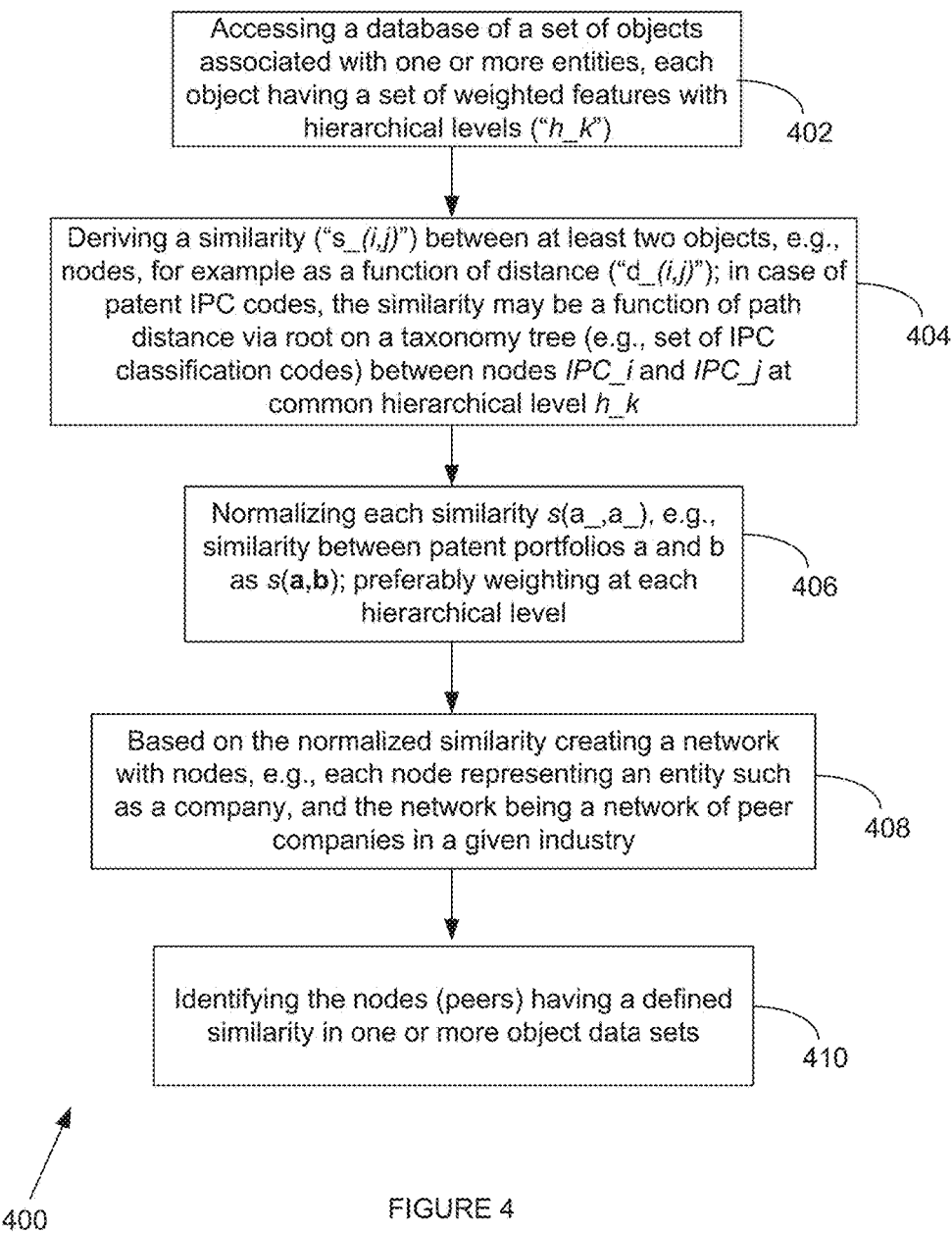
FIG. 4 is a flow chart illustrating an implementation of the present invention.
Figure 7:
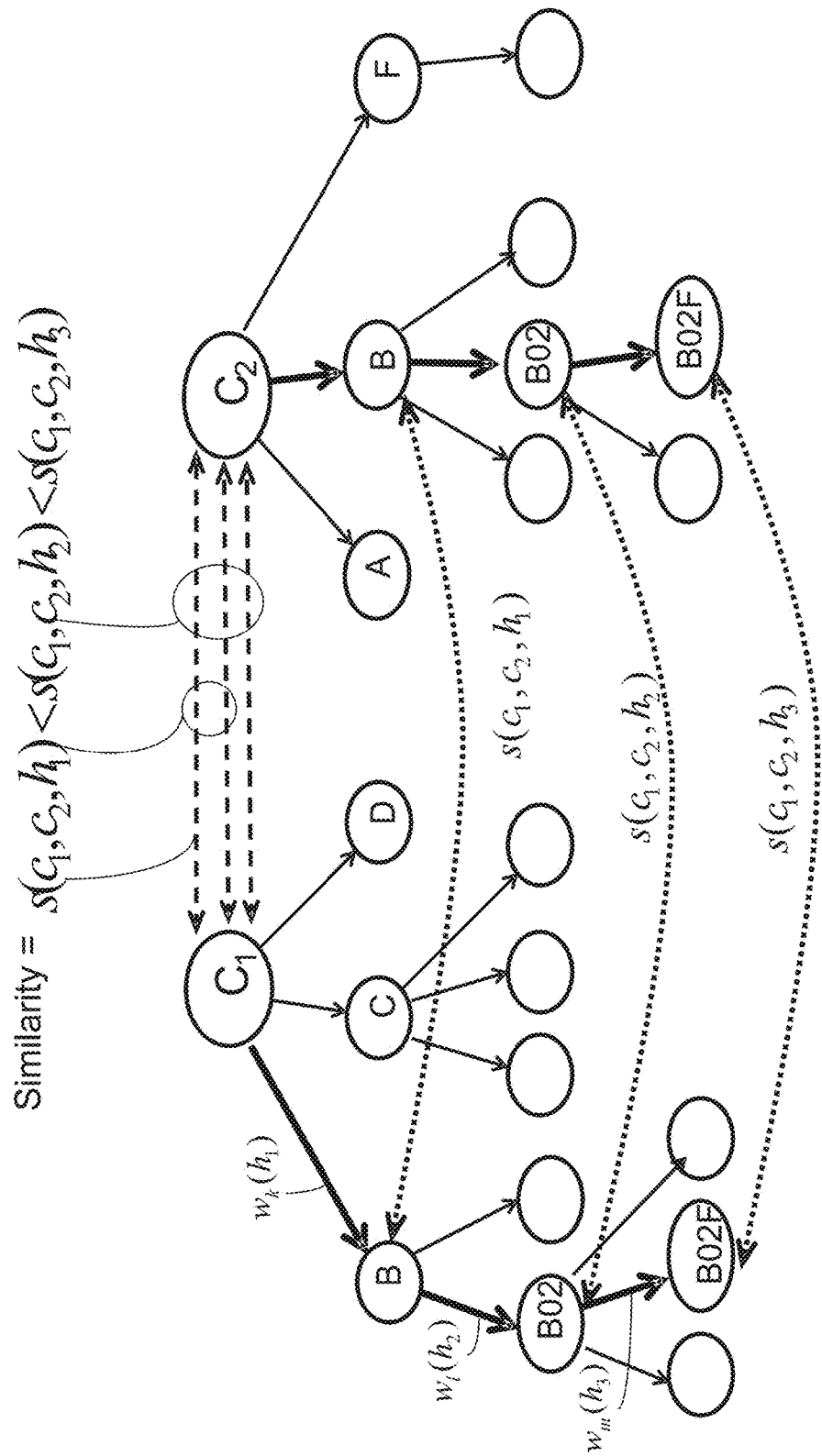
FIG. 7 is a schematic diagram illustrating a first exemplary representation of relatedness between assets of two entities with hierarchical level weighting in conjunction with the present invention.

FIG. 4 is a diagram of an exemplary method 400 for processing objects by the PDS using hierarchical weighting for determining similarities for improved results. Method 400 includes process blocks 402-410 for processing search queries received by users and for presenting search results to users. Note that the processes, functions, and data sets shown and/or described herein are generally stored in a machine readable medium, such as an electronic, optical, magnetic, or ferromagnetic medium, as coded program instructions and/or data. These are used in combination with one or more processors within a single computing or data processing system or within multiple systems that are interlinked, for example via a local or wide-area network. At step 402, upon PDS 104 receiving a user input query the PDS accesses a database comprising a set of objects associated with one or more entities, each object having a set of weighted features with hierarchical levels ("h_k"). At step 404 the PDSE engine derives a similarity ("s_(i,j)") between at least two objects, e.g., nodes, for example as a function of distance ("d_(i,j)"). In the case of patent IPC codes, the similarity may be a function of path distance via root on a taxonomy tree (e.g., set of IPC classification codes) between nodes IPC_i and IPC_j at common hierarchical level h_k. At step 406, PDS 104 normalizes each similarity s(_,_), e.g., similarity between patent portfolios a and b as s(a,b). Preferably, weighting (e.g., w(h) as shown in FIG. 7) is assigned at each hierarchical level. At step 408, based on the normalized similarity, PDS 104 creates a network with nodes, e.g., each node representing an entity such as a company, and the network being a network of peer companies in a given industry. This may be done by generating a set of feature scores from which a similarity determination may be made. The system may also normalize the set of scores using different techniques. The method may include delimiting the set of documents using a threshold scoring requirement. At step 410, the system identifies the nodes (e.g., peers, patents etc) having a defined similarity in one or more object data sets responsive to the query.

Figure 5:
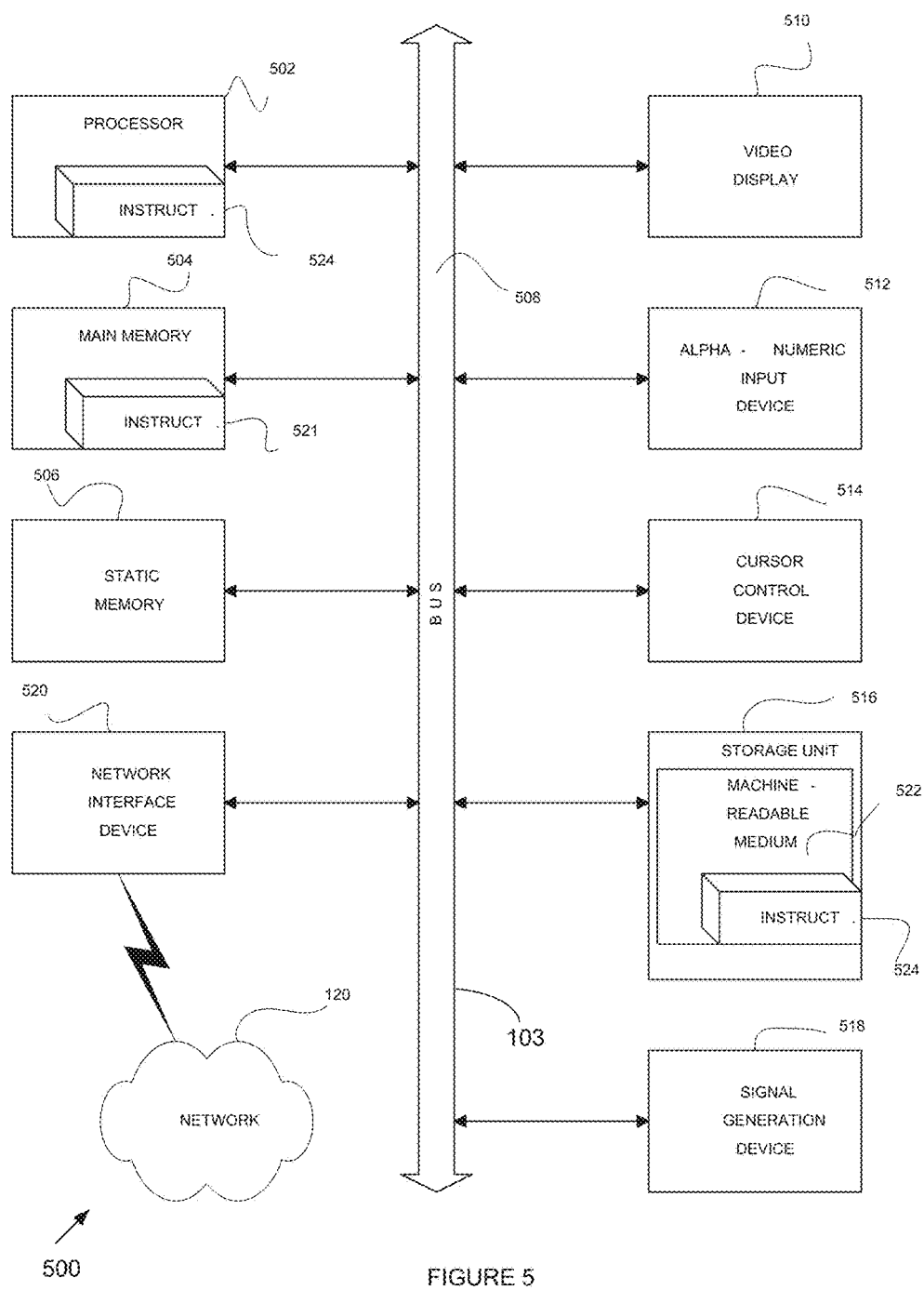
FIG. 5 is a schematic diagram of a hardware configuration of a processor-based system for implementing the present invention.

The functions described in FIGS. 2-4 and as described hereinbelow may be performed in connection with computer-based architecture, for example the architecture illustrated in FIG. 5. Now with reference to FIG. 5, an exemplary representation of a machine in the example form of a computer system 500 within which a set of instructions may be executed to cause the machine to perform any one or more of the methodologies discussed herein. In particular, the system 500, and variations of this, may be used to implement the Peer Detection System 104 of FIG. 1 and/or components of that system, e.g., Patent/Asset Analyzer 105, Feature Extraction 106, Portfolio Comparison Module 107 and User/Graphical Interface 108. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may comprise a server computer, a client computer, a personal computer (PC), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504 and a static memory 506, which communicate with each other via a bus 508. The computer system 500 may further include a video display unit 510, a keyboard or other input device 512, a cursor control device 514 (e.g., a mouse), a storage unit 516 (e.g., hard-disk drive), a signal generation device 518, and a network interface device 520.

The storage unit 516 includes a machine-readable medium 522 on which is stored one or more sets of instructions (e.g., software 524) embodying any one or more of the methodologies or functions illustrated herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 520.

While the machine-readable medium 522 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Patent Portfolio Comparison Based on IPCs Aggregated to a Given Hierarchy Level

In one manner of operation the invention may be used to provide a patent portfolio comparison based on IPCs aggregated to a given hierarchy level. For instance, finding company peers implies comparison of company profiles and several attempts have been made to create company profiles or "fingerprints" reflective of assets and endeavors of the company. This may be done in several dimensions, e.g., in the context of IP (Intellectual Property) assets fingerprint dimensions may include patent portfolio, trademarks, as well as products, fundamentals, geography, market associations, etc. Taxonomy schemes have been used, e.g., sets of classification codes, to describe dimensions to arrive at such fingerprints. Particularly, a company patent portfolio may be presented as a set T of tuples $\{t_i\}=\{IPC_i(h_k)\}, w(IPC_i(h_k))\}$, where $IPC_i(h_k)$ is the i-th IPC code in patent portfolio at the k-th hierarchy level, $w(IPC_i(h_k))$ is a number (or weight) of IPCs aggregated from all patents containing $IPC_i(h_k)$ code. Note that since there may be several IPCs characterizing a single patent, this definition applies both to patent portfolios and to single patents. In the following we call tuples $\{t_i(h_k)\}$ as aggregated IPCs at the level $h_k$. For example, patent portfolios aggregated to $h_k=3$ level for Samsung: {{G06F, 10251}, {H04N, 7800}, (H01L, 6634), ... }; for Panasonic: {{H04N, 5920}, {G06F, 4989}, {H01M, 2616}, ... }.

Known methods to calculate similarity (e.g., cosine similarity) do not take hierarchy into account and typically result in a binary decisions (0,1). For example, cosine similarity between patents having rather similar IPC codes A01B11 and A01B12 is zero. Similar to patent portfolios comparison, the problem exists in patent to patent comparison since typically a single parent may be categorized by a set of IPC codes. Besides, it is not clear how to apply normalization to compare weighted sets of hierarchical classification codes, such as patent portfolios or patents with multiple IPCs.

In this document we propose a similarity measure to compare weighted sets of hierarchical objects. As we show below, the proposed similarity measure allows to present relations among objects, e.g. companies, as a connected graph; it is hardly possible with binary type of similarity such as cosine similarity. Then we may apply network analysis methods to find peers and analyze peers evolution in time. Another advantage is that the proposed method allows us to map activities of companies on technology map to provide a view on broader technology evolution.

Relations between objects $\{c_i,c_j\}$ may be presented as a weighted undirected graph G(C,E,S), where C is a set of vertices or objects $c_i \in C$; $|C|=N_c$ is a total number of objects; E is a set of edges, $E=\{e_{i,j}\}$, $e_{i,j} \in \{0,1\}$; S is a set of weights $\{s_{i,j}\}$ associated with edges $\{e_{i,j}\}$. Then relations or similarity between objects $c_i$ and $c_j$ are denoted as $s(c_i, c_j)=s_{ij}$, $i,j=1, \ldots, N_c$. On the other hand, hierarchical attributes for a given object may be presented as a tree or a directed graph, where root denotes the object and attributes are nodes on the tree. In the following we will call relations graph G(C,E,S) as a network to avoid confusion with graphs presenting taxonomy trees.

Figure 6:
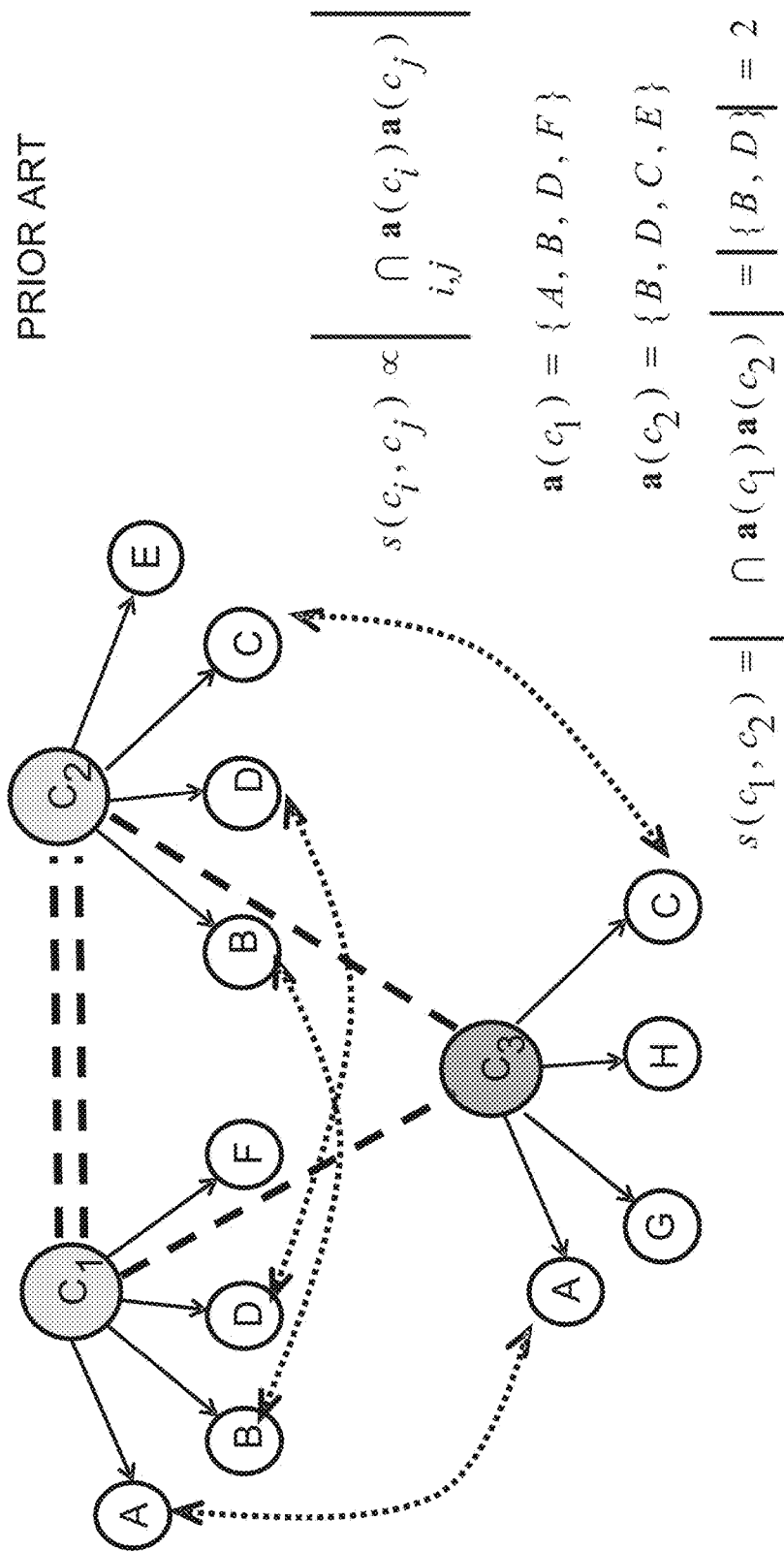
FIG. 6 is a schematic diagram showing a prior art method of representing relationships between entity assets used in processing the present invention.

FIG. 6 illustrates a known method of forming a network from objects with attributes. Let's consider objects $c_1$, $c_2$, and $C_3$ with attributes taken from a set a={A,B,C,D,E,F,G,H} as shown at FIG. 6. Similarity between objects $c_i$ and $c_j$ (shown by dashed lines) usually is defined as cardinality of intersection of corresponding subsets $a(c_i)$ and $a(c_j)$:

$$s(c_i,c_j)=|\cap a(c_i)a(c_j)| \quad \text{(Eq.1)}$$

For example, as shown in FIG. 6, similarity between subsets $a(c_1)=\{A,B,D,F\}$ and $a(c_2)=\{B,D,C,E\}$ is $s(c_1,c_2)=|\{B,$ D}|=2, while similarity between subsets $a(c_1)=\{A,B,D,F\}$ and $a(c_3)=\{A,C,G,H,\}$ is $s(c_1,c_3)=|\{A\}|=1$.

Figure 8:
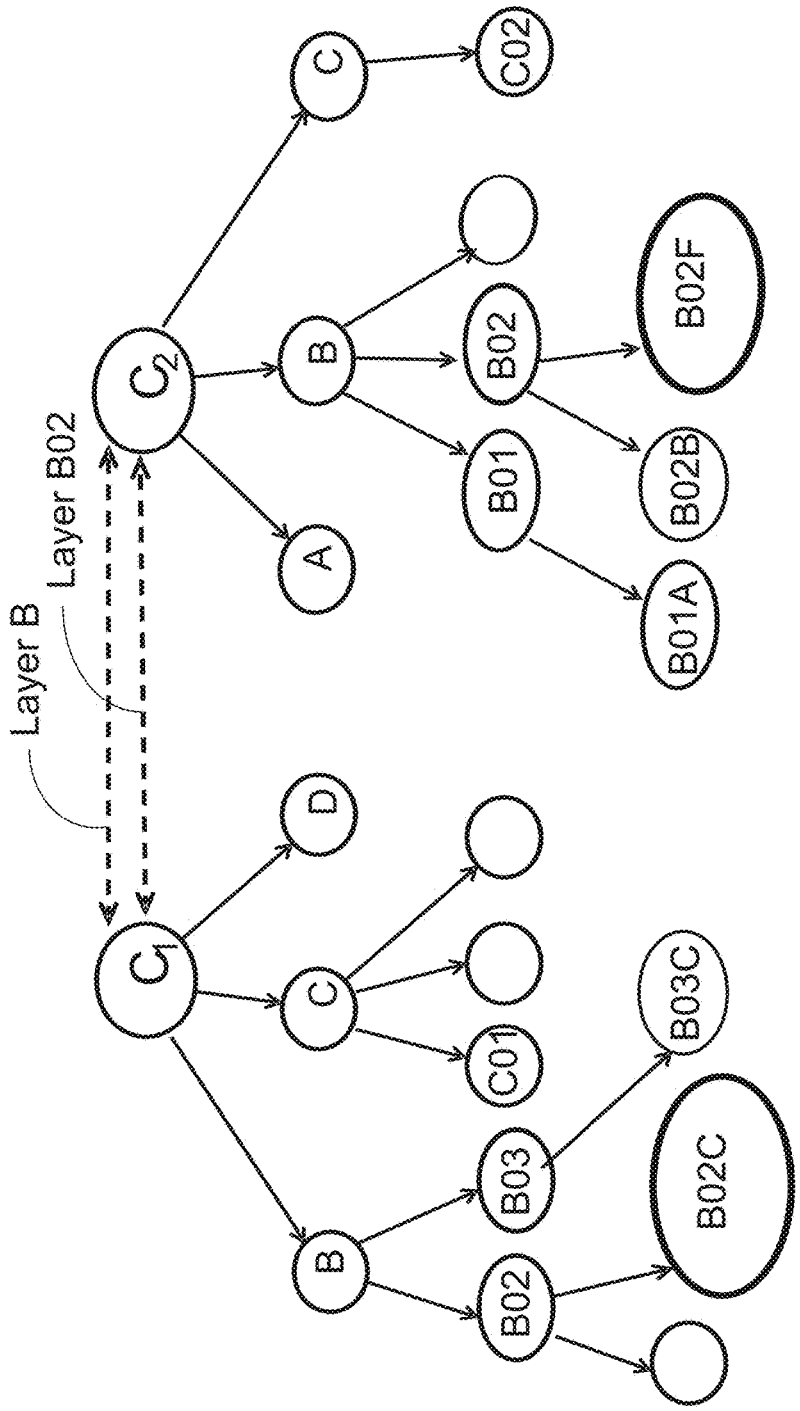
FIG. 8 is a schematic diagram illustrating a second exemplary representation of relatedness between assets of two entities with hierarchical level weighting in conjunction with the present invention.

FIGS. 7 and 8 illustrate implementation of the present invention to define relationships between objects (entities $c_1$ and $c_2$) with weighted hierarchical attributes. In case of patent portfolios, weights $w_i$ ($h_k$) may present a number of IPC codes aggregated at level $h_k$ within considered $IPC_i$ class (e.g., B02F, B02, B). Let's assume that objects $c_1$ and $c_2$ have, among others, patents in IPC category B02F, FIG. 7. Then this IPC category contributes to similarity $s(c_1,c_2)$ at three hierarchical levels {B02F, B02, B} (see dashed lines between $c_1$ and $c_2$) such that the deeper we go down on the tree, the higher similarity is:

$$s(c_1,c_2,h_1) < s(c_1,c_2,h_2) < s(c_1,c_2,h_3)$$

If we compare IPC classes B02C and B02F, then for these codes only two layers {B02, B} contribute to similarity (dashed lines at FIG. 8). Generalization to weighed sets and its applications are discussed in more detail below.

The present invention is not constrained by, and does not use, the cosine similarity approach and is not limited to exact fingerprint matches in determining similarity of patents.

Advantages of this manner of operation of the present invention include: comparison of items with hierarchical structures (measuring on a similarity scale), while current methods only allow binary comparison (discrete 0 or 1 measure); define normalized similarity measure between sets of weighted items (portfolios) which takes into account weights associated with different hierarchical levels; a wide range of applications, e.g., may be applied to compare sets of weighted ontologies.

Also, the suggested method allows to build a relations graph and use network analysis to find peers; map peers on a technology map; significantly (by several orders) reduce computation complexity compared to the standard similarity methods (e.g., cosine similarity).

Illustrative Example

The following describes an exemplary implementation of the invention using particular IPC hierarchy levels such as A01B01/02:

$IPC[h1]=A; IPC[h2]=A01; IPC[h3]=A01B; IPC[h4]=A01B01; IPC[h5]=A01B01/02$ given the following definitions: $d_{i,j}$ is min path distance via root on the taxonomy tree between nodes $IPC_i$ ($h_k$) and $IPC_j$ ($h_k$) at the same hierarchical level $h_k$; $s_{i,j}$ is similarity between $IPC_i$ and $IPC_j$; $s_{i,j}=f(d_{i,j})$.

To explain the approach, let's consider IPCs with 3 hierarchical levels and define similarity as a linear function of distance $s_{i,j}=d_{i,j}/2$. Note that in this case $s_{ij}$ corresponds (up to a scaling factor) to a number of shared hierarchy levels or number of shared nodes excluding root. Then similarity $s_{i,j}$ for nodes {i,j} at a level $h_k$ is calculated as follows IF $IPC_i[h_1]=IPC_j[h_1] d_{i,j}=2; s(IPC_i[h_1],IPC_j[h_1])=1$ IF $IPC_i[h_2]=IPC_j[h_2] d_{i,j}=4; s(IPC_i[h_2],IPC_j[h_2])=2$ IF $IPC_i[h_3]=IPC_j[h_3] d_{i,j}=6; s(IPC_i[h_3],IPC_j[h_3])=3$.

In general case $s_{i,j}=f(d_{i,j})$, where f is increasing function of distance. Then similarity $s_{ij}$ may be calculated as:

```
FOR k=1,...h_max
    IF IPC_i [h_k] = IPC_j [h_k]
        s ( IPC_i [h_k] , IPC_j [h_k] ) = f( d_ij)
    ELSE
        s (IPC_i [h_k] , IPC_j [h_k] ) = 0
    RETURN
ENDFOR
```

Note that that hierarchical IPC structure and top-down calculations significantly reduce complexity by stopping computations at a lowest matching level as shown above.

Normalization

Normalized similarity between two nodes (IPCs) at the same hierarchy level $h_k$ on a taxonomy tree may be defined as follows:

$$s(a_i(h_k), a_j(h_k))_{norm} = \frac{s(a_i(h_k), a_j(h_k))}{\sqrt{s(a_i(h_k), a_i(h_k)) s(a_j(h_k), a_j(h_k))}} = \frac{s(a_i(h_k), a_j(h_k))}{f(h_k)} \quad \text{(Eq. 2)}$$

where in general case $s(a_i,a_i)=\|a\|$ represents a weighted path length from root to node $a_i=IPC_i$ at level $h_k$. In case of $s_{i,j}=d_{i,j}/2$ the norm $\|a\|$ corresponds to number of shared hierarchy levels or number of shared nodes on the tree excluding root.

Recall that the definitions above assume that nodes are at the same hierarchical level and IPC codes have the same length $|a|$. In keeping with this exemplary implementation of the invention, we may relax this constraint: (i) by adding empty nodes (which do not match to any IPC code) to the shortest path(s) on the taxonomy tree to force IPCs to the same length; and then (ii) by applying the same approach as above for IPCs with different lengths by considering only a shared path. We can also use this approach to compare portfolios with different cardinality of IPC sets (e.g., T(a)={{G06F, 102}, {H04N, 78}, {H01L,121}} and T(b)={{H04N,53}, {H01L,48}}) and to compare patents with multiple IPCs. (e.g., P(a)={G06F, H04N, H01L} and P(b)={H04N, H01L}).

In comparing patent portfolios of two companies, let a and b be portfolios for company A and company B, $|a|=|b|=N$. To explain the approach we use $s_{ij}=f(d_{ij})=d_{ij}/2$. Then, based on (Eq.2), normalized similarity at hierarchical level $h_k$ may be defined as below:

$$s(a, b, h_k)_{norm} = \frac{1}{C} \sum_{l}^{N} \sum_{m}^{N} s_{norm}(a_l(h_k), b_m(h_k)). \quad \text{(Eq. 3)}$$

To find the normalization coefficient C let's consider the maximum match between two portfolios with equal lengths of IPCs. For illustration let' take a simple case a=b={A01B, A01C}; N=2, $|a|=|b|=3$. Note that for $a_2=b_2 \neq a_1$ we select IPC codes which match at one hierarchy level up (it could be any pair sharing A01 node) Then pairwise similarities $s_{11}=s$(A01B, A01B)=3; $s_{12}=s$(A01B, A01C)=2; $s_{21}=s$(A01C, A01B)=2; $s_{22}=s$(A01C, A01C)=3; hence $C_{max}$=sum $(s_{i,j})$=10. In general case, assuming a=b it is easy to derive $$C_{max}=NS_{max}+N(N-1)S_{max-1} \quad \text{(Eq.4)}$$

where $S_{max}$=max $S(h_{max}(|a|))$ and $S_{max-1}$=max $S(h_{max}(|a|)-1)$ are maximum possible similarities at levels $h_{max}$ and $h_{max-1}$, respectively.

In general case $s_{ij}=f(d_{i,j})$ it is easy to show that after proper normalization:

$$C_{max}(f,N,h_{max})=1+(N-1)f(h_{max}-1)/f(h_{max}) \quad \text{(Eq.5)}$$

Now we may relax constraints $N=N_1=N_2$ and $|a_i|=|b_j|$ as outlined at the paragraph after (Eq.3). In particular, we define $N=\max(N_1,N_2)$ and set for missing $\{i,j\}$ inner-product elements $a_ib_j=0$. Since inner product elements $a_ia_i>0$ and $a_ib_j\geq 0$ then $s(\{a,b,c\}, \{a,b,c\})\geq s(\{a,b,c\}, \{a,b\})$. To relax $|a_i|=|b_j|$ we define $\max|IPC|=\max_{\{i,j\}}(|a_i|\,|b_j|)$ and add wildcard sign(s) to the end of IPC codes where $|a_i|$, $|b_j|<\max|IPC|$ to include all IPC codes down to level $\max|IPC|$.

Finally normalized similarity between unweighted hierarchical sets at level $h_k$ may be represented as:

$$s(a, b, h_k)_{norm} = \frac{1}{C_{max}(f, N, h_{max})} \sum_l^N \sum_m^N s_{norm}(a_l(h_k), b_m(h_k), f(h_k)) \quad \text{(Eq. 6)}$$

To compare patent portfolios with weights $w^{(a)}(h_k)=\{w_1^{(a)}, \ldots, w_N^{(a)}\}$ and $w^{(b)}(h_k)\{w_1^{(b)}, \ldots, w_N^{(b)}\}$ the normalized similarity may be presented as:

$$s(a, b, h_k)_{norm} = \frac{1}{C_{max}} \sum_{l,m}^N \Phi(w_l^{(a)}, w_m^{(b)}, W^{(a)}, W^{(b)}, h_k) s_{norm}(a_l, b_m, h_k) \quad \text{(Eq. 7)}$$

where $\Phi(w_1^{(a)}, w_m^{(b)}, W^{(a)}, W^{(b)})$ is some function of the arguments below:

$$W^{(a)}(h_k) = \sum_{m=1}^N w_m^{(a)}(h_k) \text{ and } W^{(b)}(h_k) = \sum_{m=1}^N w_m^{(b)}(h_k) \quad \text{(Eq. 8)}$$

are total IPCs weights of patent portfolios of company A and company B at aggregation level $h_k$, respectively. Note that instead of weights other normalizations may be used, e.g., total number of patents. Aggregated weights $\{w_1^{(b)}(h_k), \ldots, w_N^{(b)}(h_k)\}$ may be obtained by querying patent database with different IPC code granularity. Note that $\Phi(a,b)$ maybe a symmetric or asymmetric function with respect to a and b. For example:

$$\Phi(a, b) = \frac{w_l^{(a)} W^{(b)}}{w_m^{(b)} W^{(a)}} \quad \text{(Eq. 9)}$$

may be used in asymmetric similarity measures; this and other functions based on subsets intersection and will be addressed later.

As an example of symmetric normalized similarity for comparing patent portfolios with weights $w^{(a)}=\{w_1^{(a)}, \ldots, w_N^{(a)}\}$ and $w^{(b)}=\{w_1^{(b)}, \ldots, w_N^{(b)}\}$ may be presented as:

$$s(a, b, h_k)_{norm} = \frac{1}{C_{max}} \sum_l^N \sum_m^N \min\left(\frac{w_l^{(a)}(h_k)}{W^{(a)}(h_k)}, \frac{w_m^{(b)}(h_k)}{W^{(b)}(h_k)}\right) s_{norm}(a_l, b_m, h_k) \quad \text{(Eq. 10)}$$

As one can see, min-function in Eq. 10 allows a straightforward interpretation as a cardinality of overlapping sets of patents within a given IPC code. For example, let's consider companies A, B, and C with similar portfolio profiles (similar IPCs) represented as a, b and c, but different portfolio volumes $W^{(a)}>>W^{(b)}>W^{(c)}$. Then clearly $s(a,b)<s(b,c)$.

Similarity between patent portfolios may be further refined:
(i) by defining a set of similarities at different levels, $s(a,b)=\{s(a, b, h_k)_{norm}|k=1, h_{max}\}$
(ii) by defining a cumulative similarity $s(a,b)$ over all levels, as:

$$s(a, b) = \frac{1}{C_{max}} \sum_k^{k_{max}} \sum_l^{N(h_k)} \sum_m^{N(h_k)} \Phi(w_l^{(a)}, w_m^{(b)}, W^{(a)}, W^{(b)}) s_{norm}(a_l, b_m, h_k) \quad \text{(Eq. 11)}$$

For example, based on (Eq. 10) cumulative symmetric similarity between patent portfolios is given by:

$$s(a, b) = \frac{1}{C_{max}} \sum_k^{k_{max}} \sum_l^{N(h_k)} \sum_m^{N(h_k)} \min\left(\frac{w_l^{(a)}(h_k)}{W^{(a)}(h_k)}, \frac{w_m^{(b)}(h_k)}{W^{(b)}(h_k)}\right) s_{norm}(a_l, b_m, h_k). \quad \text{(Eq. 12)}$$

Portfolio Concentration Measure

In many cases it is important to get information on whether a given company is concentrated on a certain technology domain or investing in a broad spectrum of technologies. To address this topic we introduce a new metric named as patent portfolio concentration. One way to introduce this metric is to use normalization coefficient $C_{max}$ defined by (Eq.4).

Recall that the normalization $C_{max}$ is done with respect to the highest possible value of similarity. In case of weighted portfolios comparison $C_{max}$ it is only achieved if all IPC codes belongs to a single parent IPC class and portfolio weights are uniformly distributed under this parent class. This property has roots in information theory and may be treated as self-information (or entropy) of the parent class for a given level of aggregated IPCs. It allows us to define self-information of a parent class based on (Eq. 10) by setting a=b, presented as:

$$s(a, a, h_k) = \frac{1}{C_{max}} \sum_{l,m}^N \min\left(\frac{w_l^{(a)}(h_k)}{W^{(a)}(h_k)}, \frac{w_m^{(a)}(h_k)}{W^{(a)}(h_k)}\right) s(a_l, b_m, h_k) \quad \text{(Eq. 13)}$$

In case of patent portfolios comparison, Eq.13 provides a measure showing whether activities of a company are concentrated on a single patent class or spread over several parent classes. In the following we call this measure as portfolio concentration (or portfolio diversity for its counterpart).

Furthermore, to make more accurate comparison of companies we need take into account a total number of patents or volumes of portfolios. In particular, companies may have similar patent portfolio concentration, but significantly different volumes. To address this issue we introduce a novel 2-dimensional metric for a company characterization: portfolio concentration vs portfolio volume. Examples of this comparison will be shown below.

Also note that $C_{max}$ provides a global normalization over all possible portfolio configurations, we will use this property to build a global view (network presentation) on relations among all companies.

Similarity from Information Theory Perspective

If we interpret normalized weights $v(h_k)=\{v_1, \ldots, v_N\}$, $v_l(h_k)=w_l(h_k)/W(h_k)$ at hierarchy level $h_k$ as probabilities $p_l$ of a discrete random variable V, then we may use a set of information theory measures for variables $V^{(a)}(h_k)$ and $V^{(b)}(h_k)$ corresponding to different portfolios at hierarchy level $h_k$.

For example, entropy H(V) or self information I(V, V) of a parent node at level $h_{k+1}$ with associated weights $w(h_k)$ may be defined as:

$$H(V(h_k)) = I(V(h_k), V(h_k)) = -\sum_l^{N(h_k)} p_l(h_k)\log p_l(h_k) \qquad (Eq. 14)$$

Cross entropy between $V^{(a)}(h_k)$ and $V^{(b)}(h_k)$:

$$H(V^{(a)}(h_k), V^{(b)}(h_k)) = -\sum_l^{N(h_k)} p_l^{(a)}(h_k)\log p_l^{(b)}(h_k) \qquad (Eq. 15)$$

Kullback divergence:

$$D(V^{(a)}(h_k) \| V^{(b)}(h_k)) = H(V^{(a)}(h_k), V^{(b)}(h_k)) - H(V^{(a)}(h_k)) = \qquad (Eq. 16)$$
$$-\sum_l^{N(h_k)} p_l^{(a)}(h_k)\log p_l^{(b)}(h_k) + \sum_l^{N(h_k)} p_l^{(a)}(h_k)\log p_l^{(a)}(h_k)$$

Jensen-Shannon divergence (symmetrized version of Kullback divergence):

$$JSD(V^{(a)}(h_k)\|V^{(b)}(h_k))=(D(V^{(a)}(h_k)\|M)+D(V^{(b)}(h_k)\|M))/2 \qquad (Eq. 17)$$

where $M=(V^{(a)}(h_k)+V^{(2)}(h_k))/2$.

Mutual information:

$$I(V^{(a)}(h_k); V^{(b)}(h_k))=H(V^{(b)}(h_k))-H(V^{(b)}(h_k)|V^{(a)}(h_k)) \qquad (Eq. 18)$$

Normalized asymmetric version of mutual information:

$$U(V^{(a)},V^{(b)})=I(V^{(a)};V^{(b)})/H(V^{(b)}) \qquad (Eq. 19)$$

Symmetric redundancy measure:

$$R(V^{(a)},V^{(b)})=I(V^{(a)},V^{(b)})/(H(V^{(a)})+H(V^{(b)})) \qquad (Eq. 20)$$

Note that formula for max value of redundancy measure:

$$\max R(V^{(a)},V^{(b)})=\min(H(V^{(a)},H(V^{(b)})/(H(V^{(a)})+H(V^{(b)})) \qquad (Eq. 21)$$

has similar form as Eq.13.

Depending on a study case we may use different measures as above to define similarity between objects and find peers.

For example, using information theory approach we may aggregate information from different hierarchical levels as below (cf. Eq.11):

$$s(a, b) = \qquad (Eq. 22)$$
$$\frac{1}{C_{max}}\sum_k^{k_{max}}\sum_l^{N(h_k)}\sum_m^{N(h_k)} \Phi(p_l^{(a)}(h_k)\log p_l^{(a)}(h_k), p_m^{(b)}(h_k)\log p_m^{(b)}(h_k))$$
$$s_{norm}(a_l, b_m, h_k).$$

Procedure to Compare Aggregated Patent Portfolios of Two Companies

Given two sets of classification codes (e.g., patent portfolio) defined on the same classification tree:
  (i) define graph-based similarity metric as a function of distance between nodes on the underlying classification tree (e.g., for IPC we take distance on taxonomy tree via root);
  (ii) calculate pair-wise similarity between nodes by mapping nodes (IPCs) from different portfolios to the underlying classification tree (see Eq.2);
  (iii) calculate similarity metric between sets of weighted classification codes (general case Eq.7, Eq.11, Eq.22, examples Eq.10, Eq.12, Eq.13).

The same methodology applies for comparison of two ontologies with a difference that instead of a single underlying tree as in the case above, there may be several (or a forest of) underlying trees. It implies that mapping of ontology objects and similarity calculations should be aggregated over relevant subsets of underlying trees. It could be done by extending the methodology described above.

Network Presentation

Figure 9:
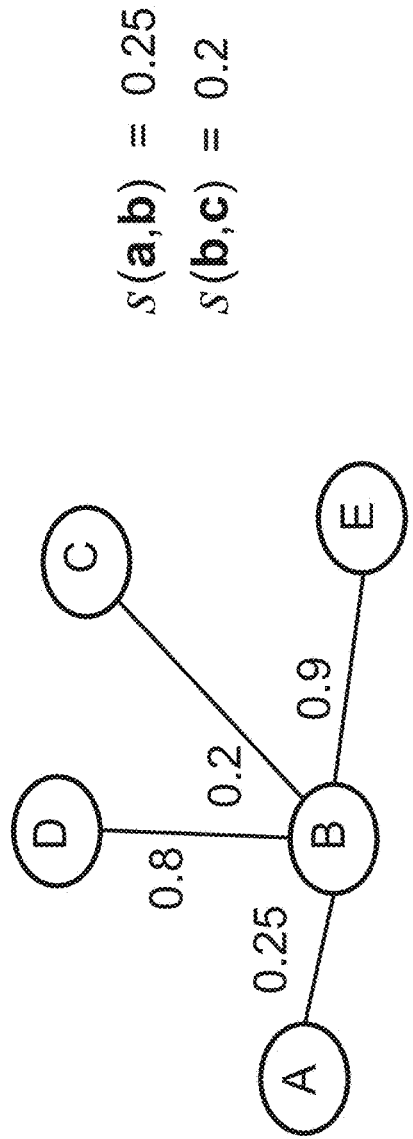
FIG. 9 is a schematic diagram illustrating a local view of peers of company B.

FIG. 9 illustrates a local view of a network of company peers in which peers of company B are presented by the ordered set {E,D,A,C}. In the local view, pair-wise similarity between company portfolios is determined as groups of IPC codes with similarity scores shown.

Figure 10:
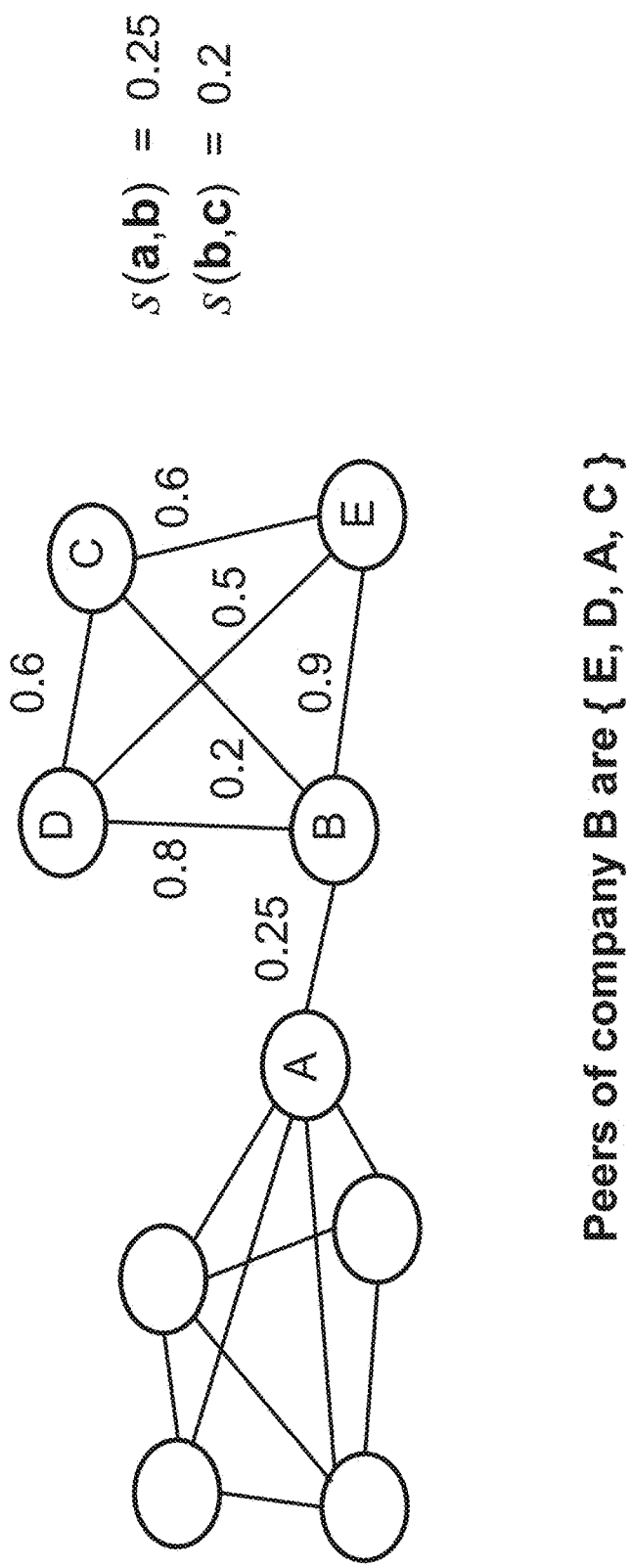
FIG. 10 illustrates a global view example (a network) of peers for company B.

FIG. 10 illustrates a global view of a network of company peers in which peers of company B are the set {E,D,A,C}. However additional potential peers may be derived when considering the network of peers associated with peer Company A.

Figure 11:
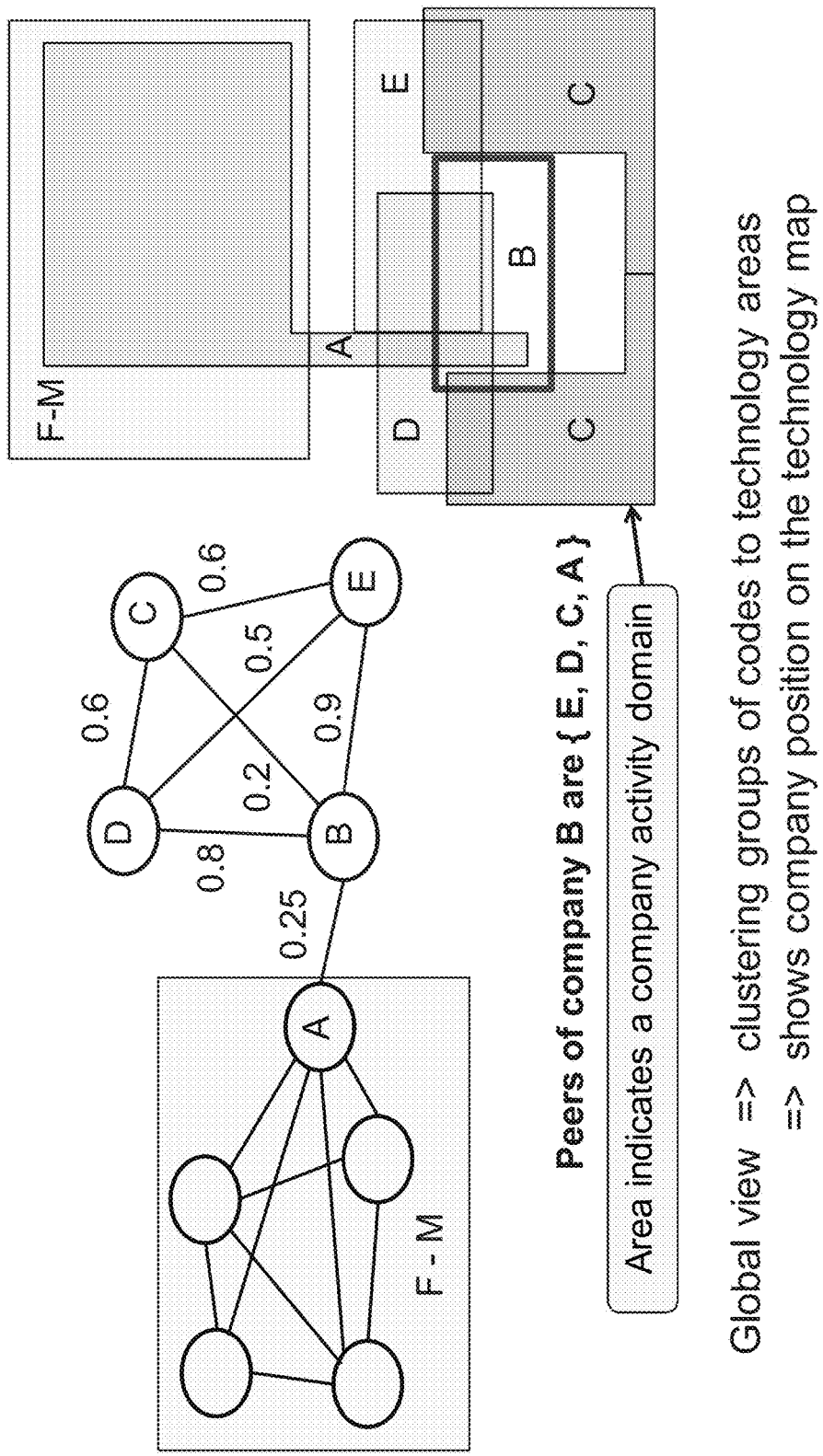
FIG. 11 shows a network of company peers combined with company activities.

FIG. 11 illustrates a further combined global view of a network of company peers in which peers of company B are the set {E,D,A,C}. Note the change in peers order due to the fact that company A belongs to the isolated cluster F-M, while other peers belongs to the same cluster as company B. As depicted, additional potential peers companies F-M, may be derived when considering the network of peers associated with peer Company A. In this enhanced view, the global view includes clustering groups of codes to technology areas and shows company positions on the technology "map." The areas illustrated on the technology map indicate domains of activity associated with the indicated company.

Networks are dynamic and changing over time with some companies becoming peers and other peer companies losing the association as a peer company due to any number of reasons. Over time companies enter the competitive landscape and fall out of the landscape. Companies change direction and enter new areas of technology and may cease operating in long-involved areas of technology.

FIG. 12 represents various graphical depictions of networks at various stages of formation, change and demise, e.g., see G. Palla et al. Quantifying social group evolution, Nature 446, 6640667, Apr. 2007. These graphical representations are highly effective in use with humans where visualization is a key mechanism to convey highly complex data and concepts. Mountains of data cannot convey what a visual representation of that data and the underlying processes applied to the data can reveal.

Figure 13:
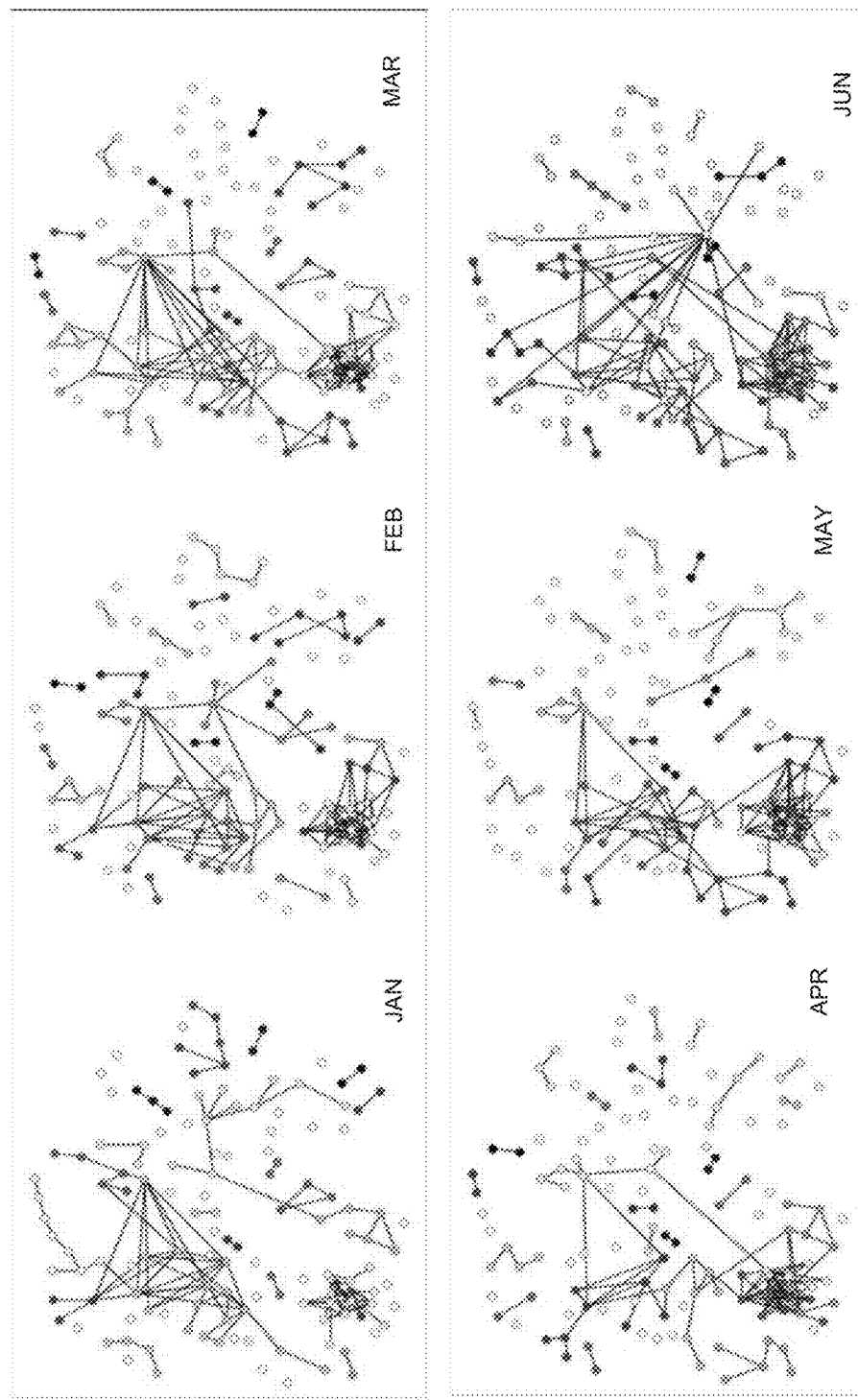
FIG. 13 shows an example of network evolution in time (network snapshots) together with clustering (communities) within each snapshot.

FIG. 13 illustrates an example of a network evolving in time with community formation in a series of network snapshots, e.g., see N. Nefedov, "Analysis of Communities Evolution in Dynamic Social Networks", in "Studies in Computational Intelligence: Complex Networks IV", vol 476, pp. 39-46, Springer-Verlag Berlin, 2013, which is hereby incorporated herein by reference. In this example vertices may denote companies, colors may indicate dominant companies' IPCs.

Figure 14:
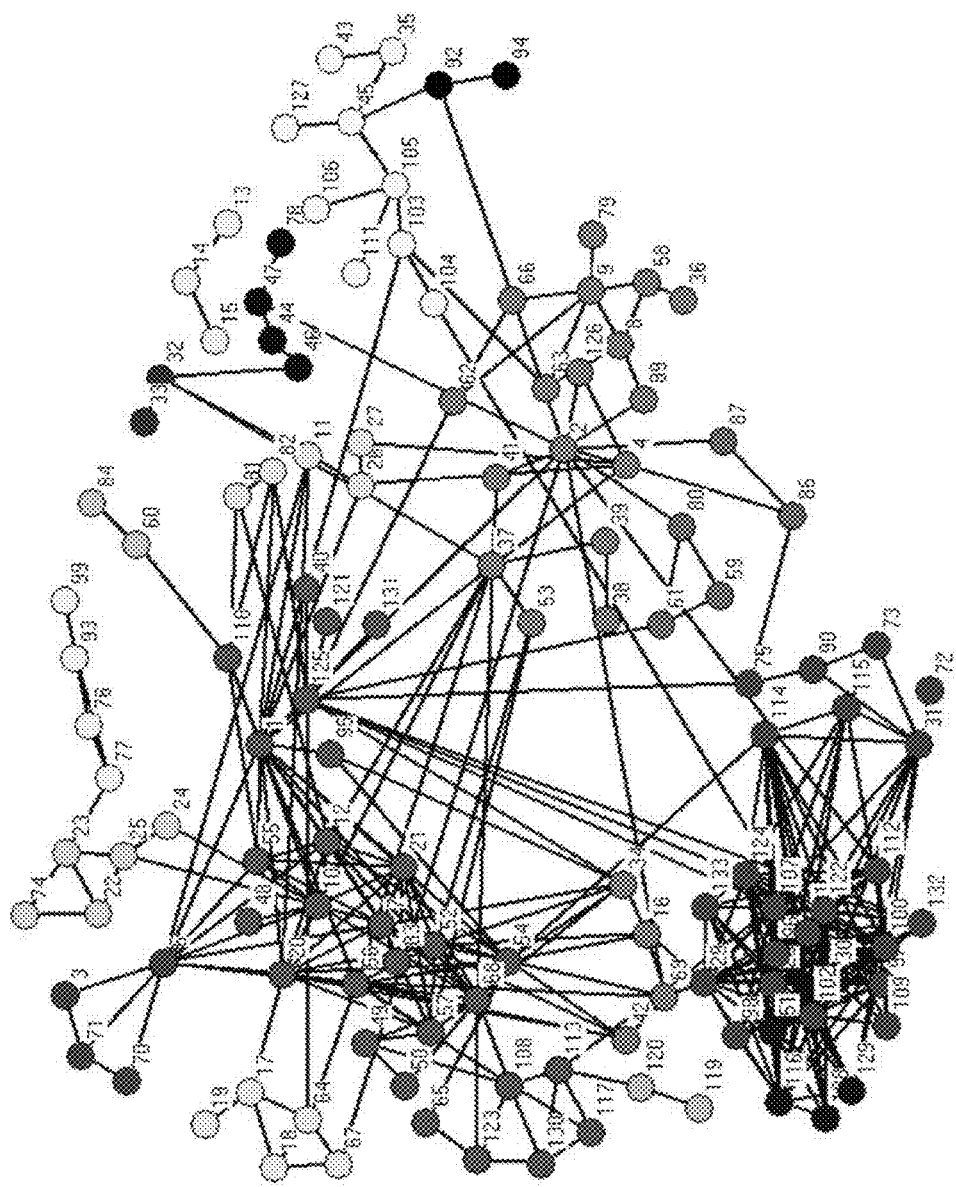
FIG. 14 presents an exemplary graphic illustration of a network aggregated over time with relevant clustering.

FIG. 14 illustrates an aggregated network enabling users to detect existence of communities (clusters) in a network. In case of patent portfolios, clusters may be interpreted as technology areas.

Figure 15:
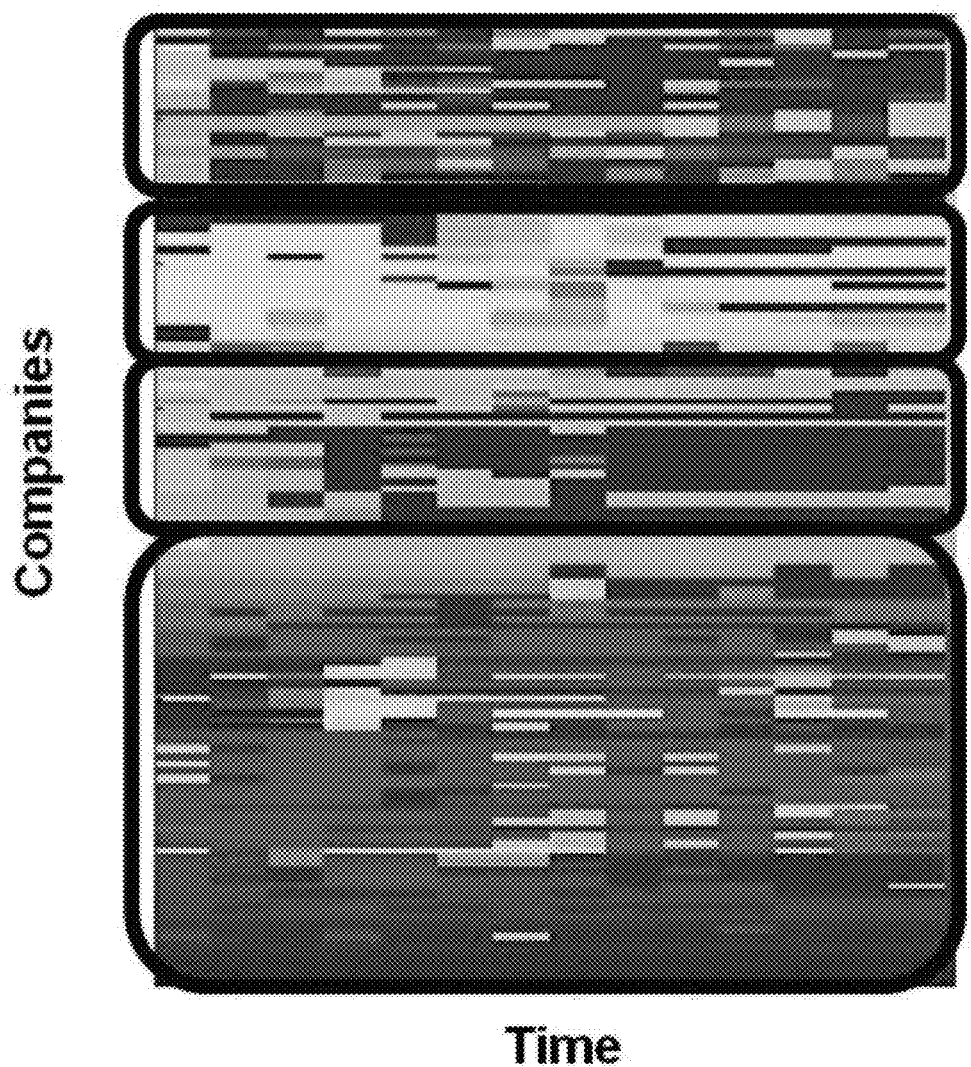
FIG. 15 shows an exemplary graphic illustration of clusters evolution in time.

FIG. 15 presents an example of grouping of companies into clusters according to FIG. 13-14 and evolutions of clusters (technology areas) in time. This view provides insights on, among other things: (i) company strategy and its position on a technology map; (iii) strategy evolution of a given company and its peers; and (iii) evolution of technology areas.

Figure 16:
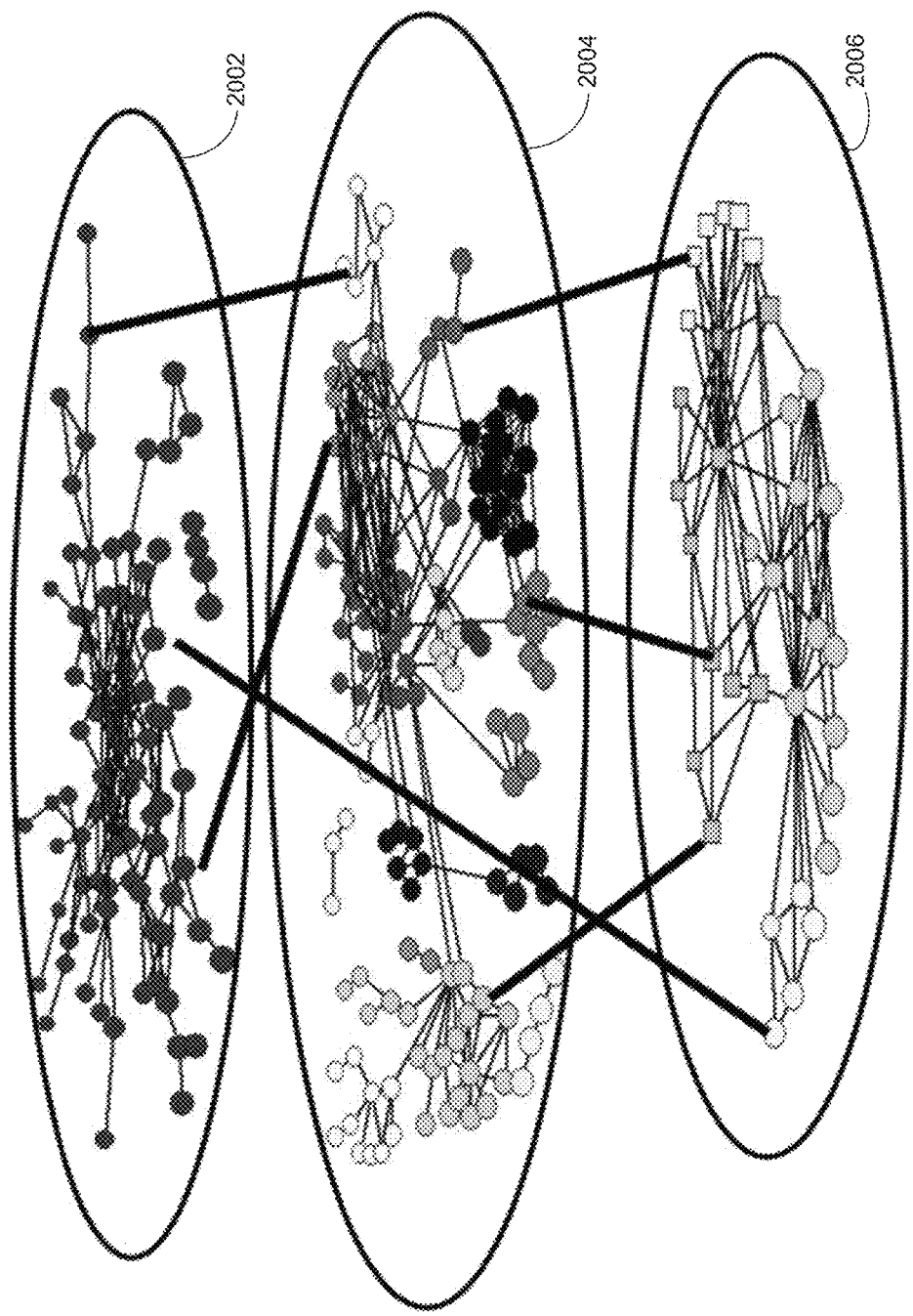
FIG. 16 depicts an exemplary graphic illustration of multi-layer network.

Another application of network analysis is in providing tools to merge information from different sources, where information from each source is presented as a network. FIG. 16 represents an example of a company fingerprint in form of a multi-layer network including a products layer 2002, patents layer 2004 and a trademarks layer 2006. To merge information we may use known methods, e.g., see X. Dong et al, Clustering on Multi-Layer Graphs via Subspace Analysis on Grassmann Manifold, in IEEE Trans. Signal Processing, pp. 905-918, vol. 62, No. 4, Feb. 2014.

Figure 17:
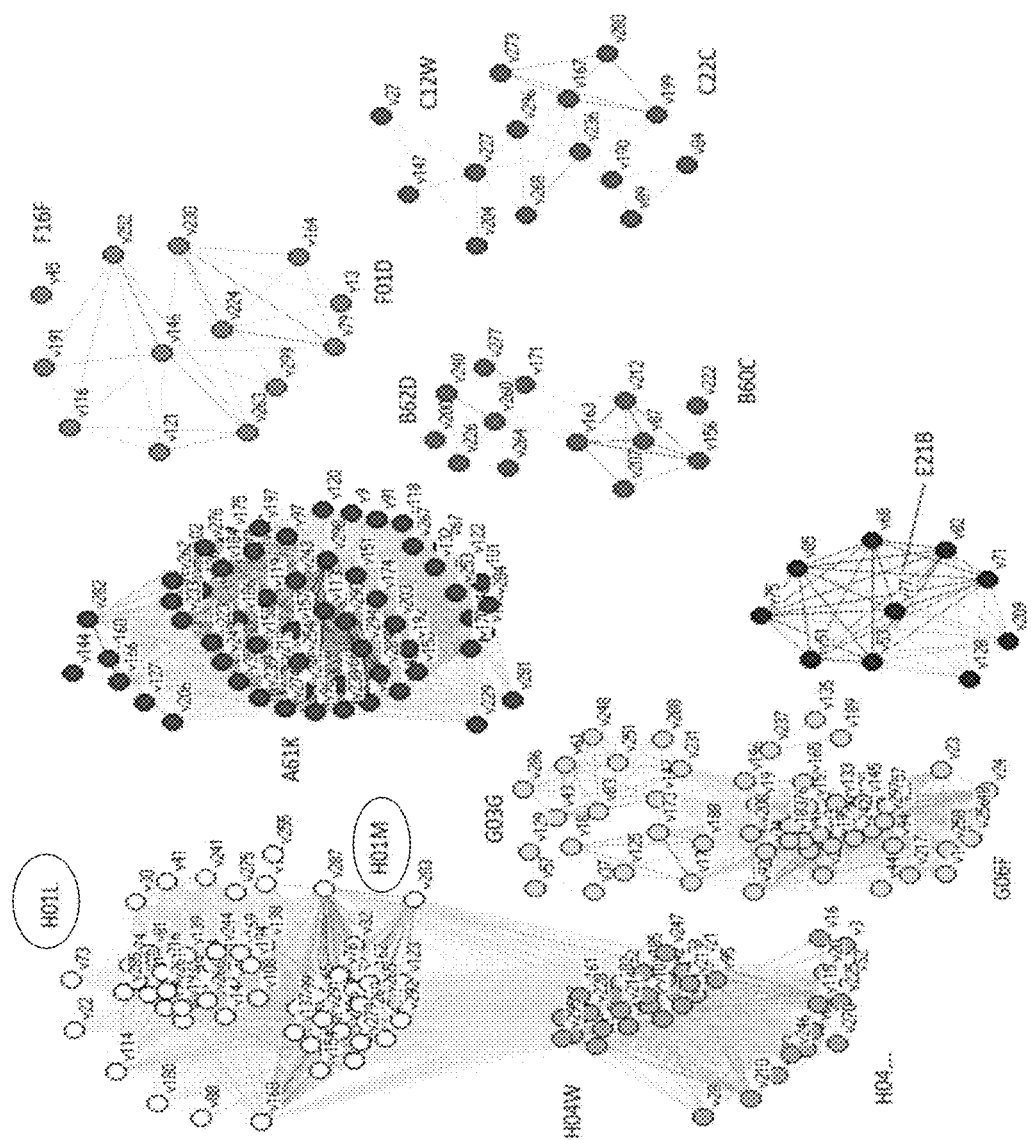
FIG. 17 shows an exemplary graphic illustration of company peers network.

FIG. 17 presents an illustrative network example built using the suggested approach for a set of 300 companies where portfolio of each company consists of only one IPC code with the maximum weight. As one can see, even in this simplified case the suggested approach noticeably enrich network connectivity and allows to find more peers and associate company to a technology areas represented by connected clusters. For example, there are connections between clusters (indicated by spatially close groupings), e.g., H01L and H01M circled, and others, which would not exist if using cosine similarity.

Figure 18:
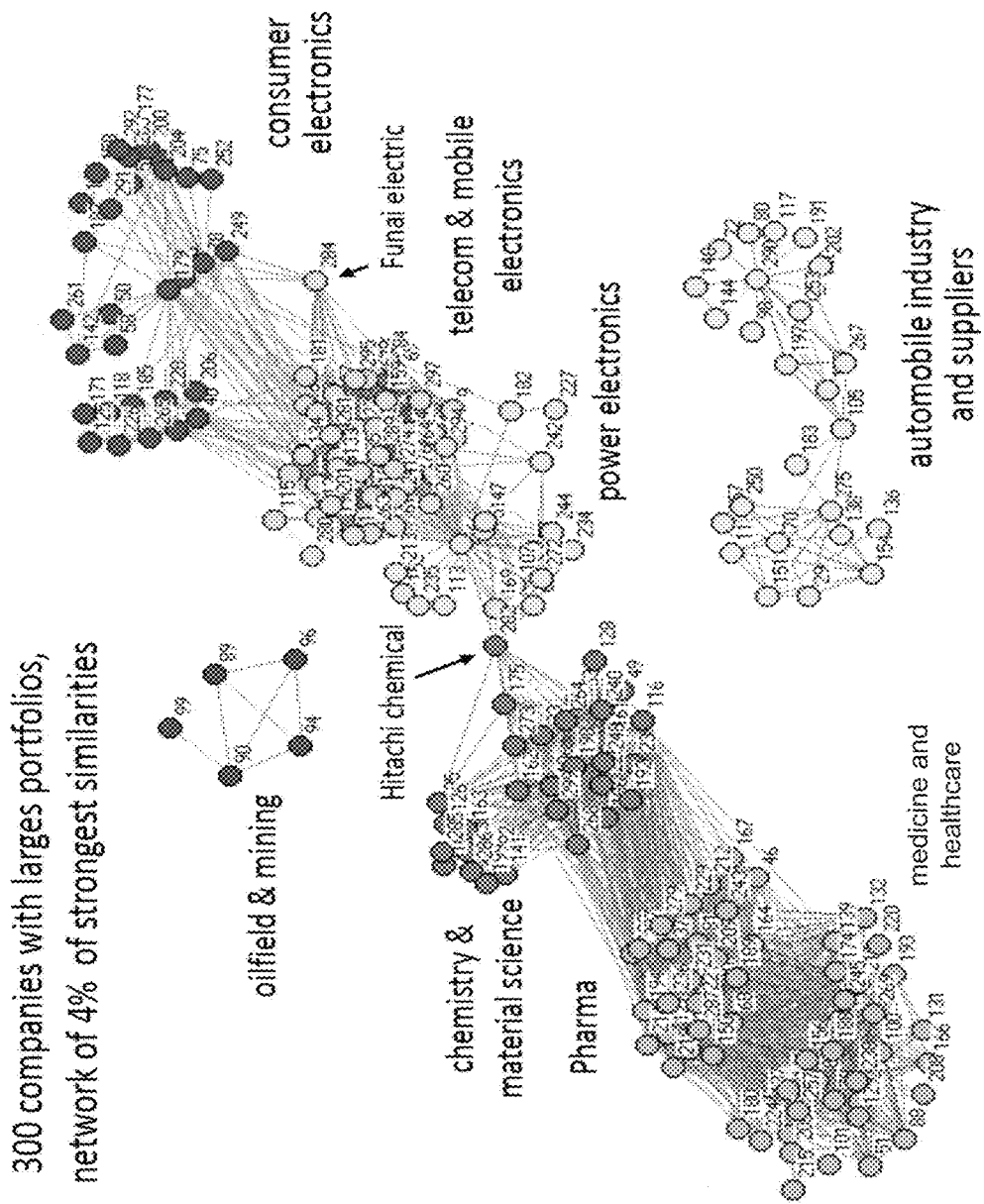
FIG. 18 shows another example of company peers network.

FIG. 18 shows a network example built using 10 IPC codes with largest weights in each patent portfolio. We found that the suggested method results in a fully connected network, i.e., there exists a path between any pair of nodes, total number of edges about 87,000. For visualization purpose at FIG. 18 we used only 4% of largest similarity values. As one can see, even under this simplification, the suggested method results in good connected clusters which allows to find well-defined clusters indicating technology areas, e.g., oilfield & mining, chemistry & material science, Pharma, consumer electronics among others.

Figure 19:
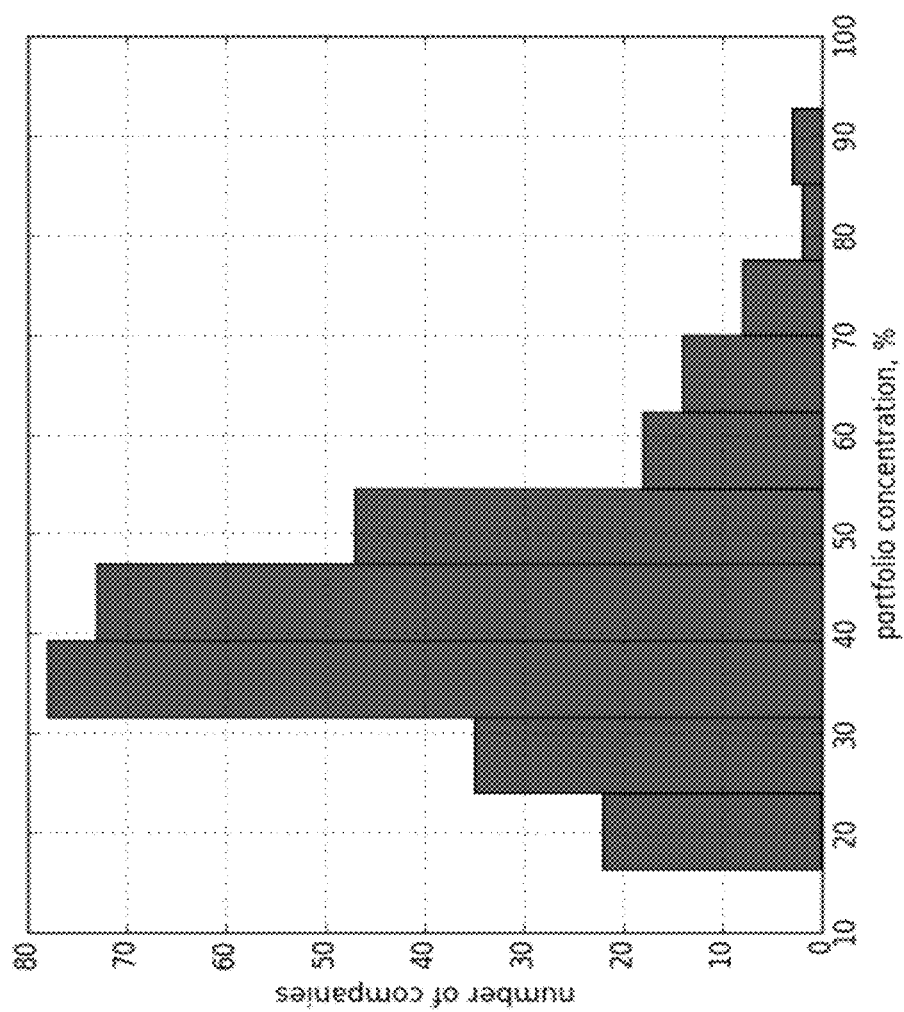
FIG. 19 presents an exemplary graphic illustration of portfolio concentration histogram.

FIG. 19 depicts portfolio concentration distribution (histogram) for 300 companies presented at FIG. 18. In particular, it shows that most of companies have portfolio concentration around 40%, while only a few have very narrow profile.

Figure 20:
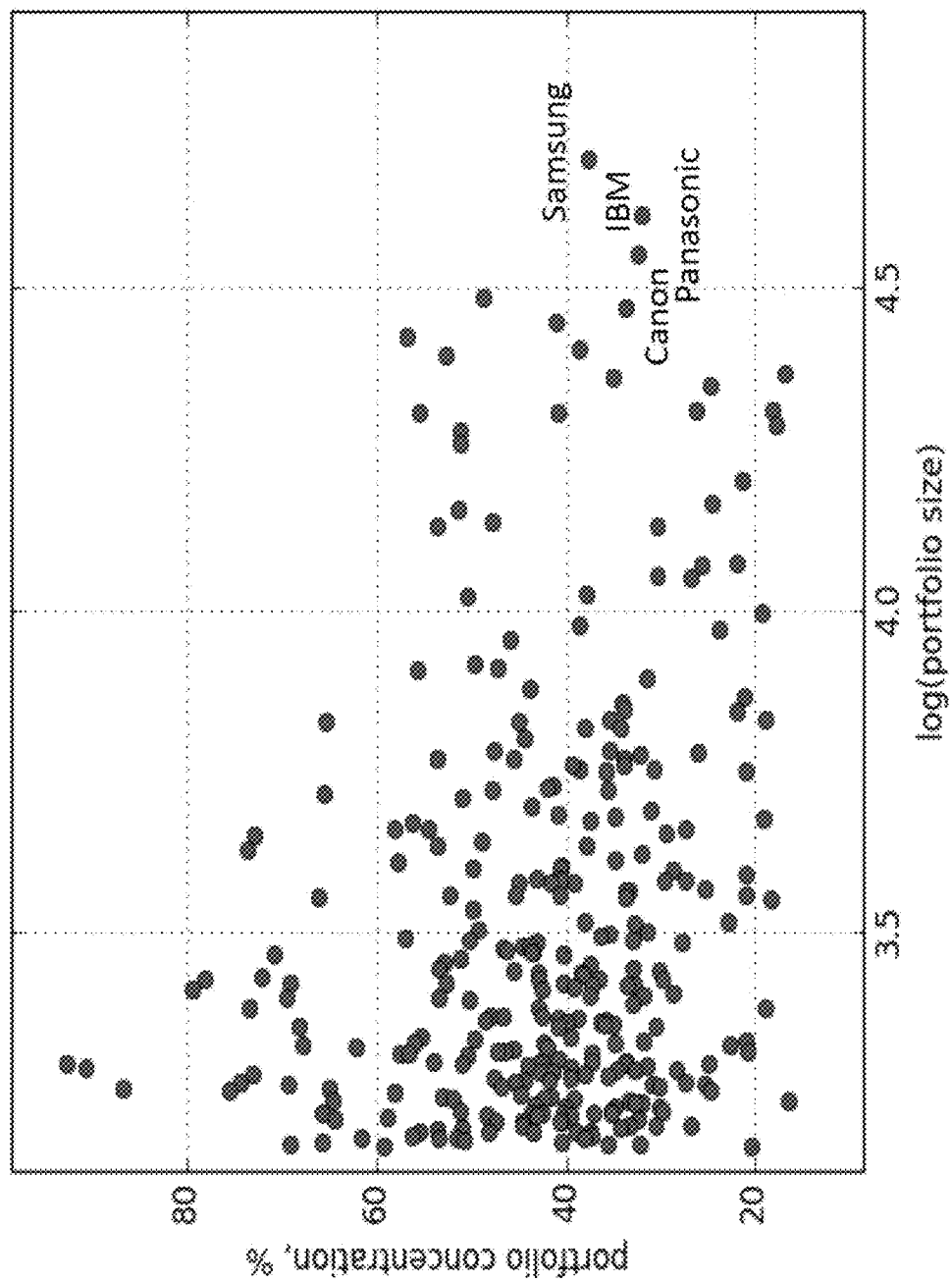
FIG. 20 illustrates an exemplary graphic of proposed 2-dimension metric.

FIG. 20 illustrates an exemplary representation of using a novel 2-dimension metric to compare companies and search for peers, in this example company portfolio concentration versus its portfolio size. In particular, FIG. 20 depicts results for 300 companies from FIG. 18. As one can see, in this example Samsung has the largest patent portfolio with median portfolio concentration (cf. FIG. 19).

Computation Complexity

In general case similarity is to be calculated between each pair of nodes, its complexity is $O(N^2)$: e.g., if number of objects (companies) is $N_c=10^5$ then number of pairs $N_c^2 \sim 10^{10}$. Complexity of similarity computations may be significantly reduced by using network presentation complimented with hierarchical clustering. For example, in flat sparse networks a number of edges $E=Nd/2$ and $d<<N$, where d is average node degree. Hierarchical clustering reduces computation complexity even further.

Application of network analysis for peers search

The following describes a method for applying network analysis for peer searching to detect and define relationships among peer entities. For example, the method may be implemented as follows:

(i) build a network representing pair-wise similarity relations between objects as described above (Eq.7);

(ii) apply network analysis to find peers and map them on a technology map; network analysis examples may include known methods, such as: hierarchical clustering (e.g., using modularity maximization, see Newman MEJ (2004) Fast algorithm for detecting community structure in networks. *Physical Review*, E 69, 066133) to find stable communities at different hierarchical levels (see Lambiotte R et al, Laplacian Dynamics and Multiscale Modular Structure in Networks, ArXiv: 0812.1770v3); introduce similarity between temporal network snapshots (e.g., see N. Nefedov, 2013) to identify disruptive events (outliers); analyze clusters evolution and its interactions; combine information from different domains: multi-layer networks (e.g. patents, trademarks, products etc, (all have classifications codes)) (e.g., see X. Dong et al, 2014); and (iii) network presentation for peers and network analysis integrated into GUI allows to perform advanced search subject to multiple criteria. For example, depending on requirements, it allows to zoom any hierarchical level in classification taxonomy and then search relevant peers at the selected level. Another important example is to search peers for any user defined set of classifications codes (IPCs) and portfolio volumes. For example, one may search for companies active in developing sensors (IPC=G01C001) for cardiology implants (IPC=G01S00). Another example is to find companies with a user defined profile for a possible acquisition.

The suggested method is not restricted to the patent informatics and is applicable for any item associated with hierarchal classification schemes.

Direct patent portfolios comparison without IPC aggregation

Methods described above are based on patent portfolios containing aggregated IPCs to provide a global view on company strategy, company peers, peer activities and clustering in technology domains and its evolution in time. These methods provide a basis to form a ranked list of company peers, including user-specified technology areas on interest. However, after a ranked list of peers is found, it may be further desirable to make a detailed pair-wise comparison of patent portfolios for selected companies, including patent by patent comparison. Detailed information required for direct comparison of patent portfolios is not readily extracted from aggregated IPCs portfolios, there are many ways to decompose aggregated IPCs portfolio into a given number of patents, Direct patent portfolio comparison provides means to employing a PDSE 105 configured for aggregated portfolio approach to refining patent portfolios comparison. FIGS. 21-28 describe embodiments of the PDS 104 in the following manner of operation using asymmetric techniques with three enhancements to the PDSE 105: ability to compare patent portfolios directly without taking the intermediate step of aggregation; ability to introduce two asymmetric peer measures instead of using just one symmetric peer measure; and ability to introduce a mechanism that allows the user to zoom in on specific "areas of peers" from a UI/UX perspective.

Figure 21:
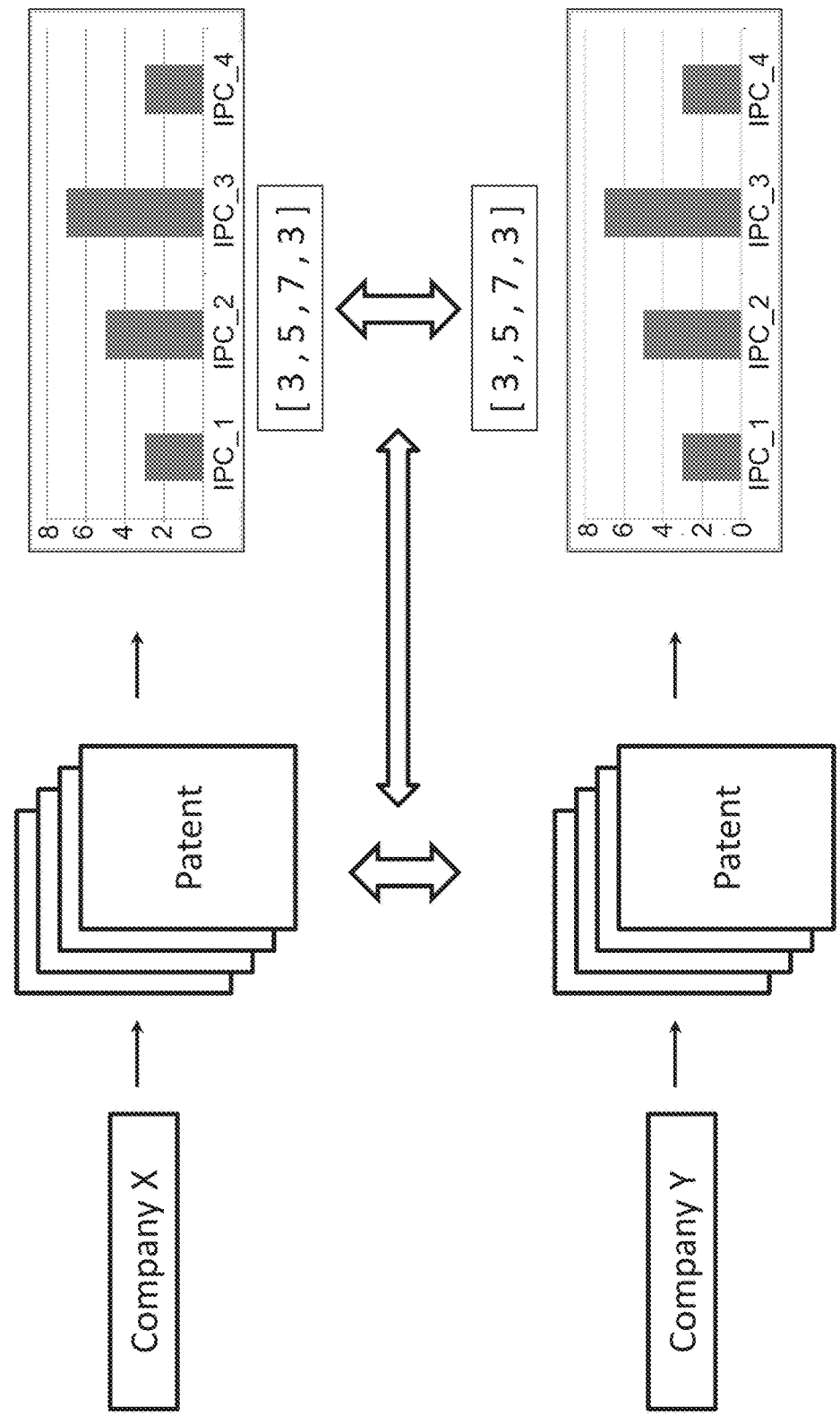
FIG. 21 illustrates one example of the aggregate approach using cosine similarity for comparison purposes.

FIG. 21 illustrates one example of the aggregate approach using cosine similarity for comparison purposes. As shown in FIG. 21, two companies, X and Y, each have the same aggregated profile, namely three (3) patents containing IPC code IPC_1; five (5) patents containing IPC code IPC_2; seven (7) patents containing IPC code IPC_3; and three (3) patents containing IPC code IPC_4. The IPC fingerprint (=the aggregated view) can be represented as a vector [3,5,7,3].

Figure 22:
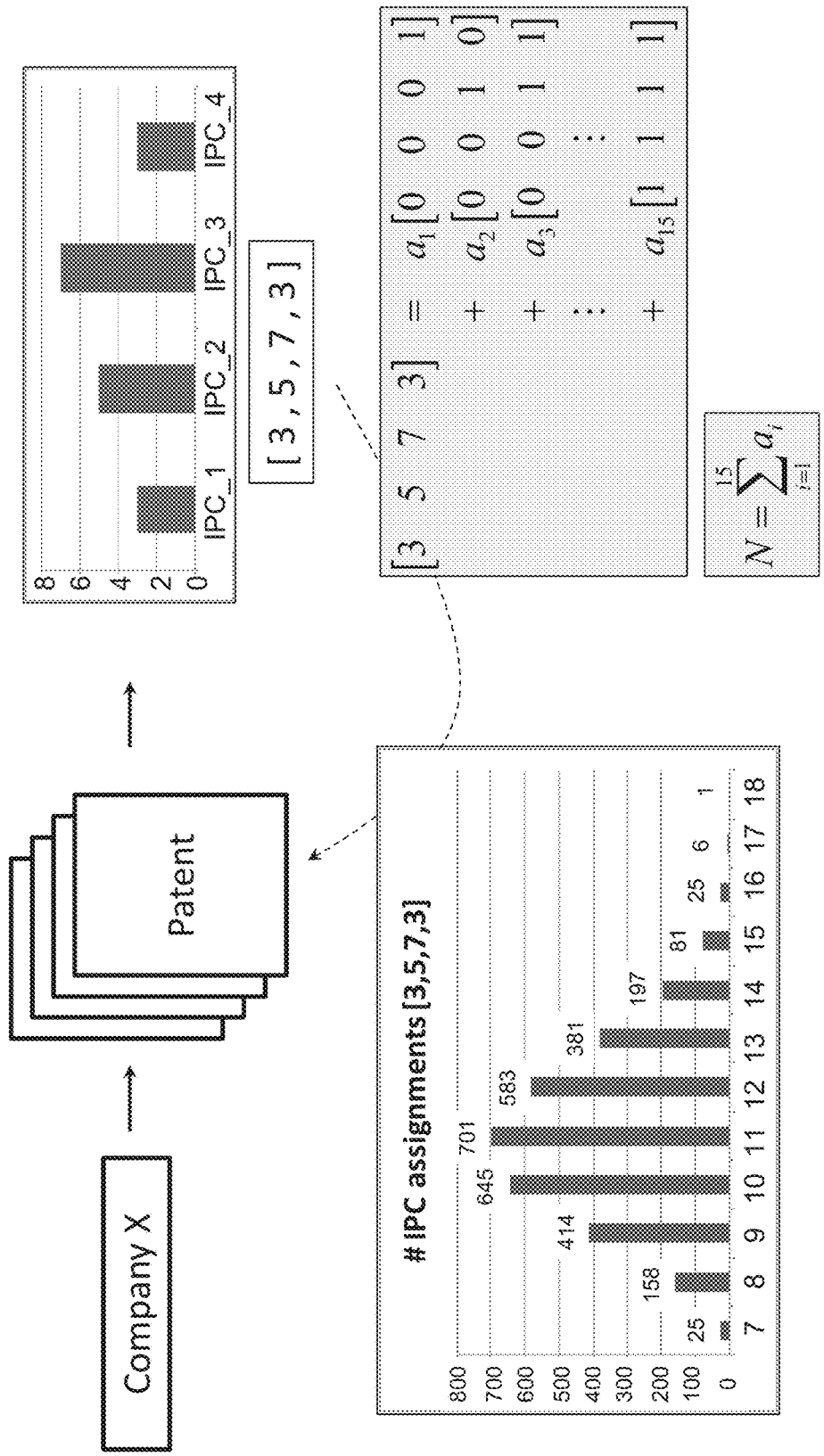
FIG. 22 represents an exemplary mathematical analysis performed with respect to the portfolio of company X.

FIG. 22 represents mathematical analysis performed with respect to the portfolio of company X. Assuming, for example, that the patent portfolio generating this profile contained 11 patents, there are 701 different combination of IPC assignments that result all in exactly the same fingerprint, namely [3,5,7,3]. The only situation where the IPC assignments is uniquely defined, given the [3,5,7,3] fingerprint, is when the portfolio of company X contains 18 patents. In this case every patent contains only one IPC code. In this example, analysis shows that fingerprint equality does not mean patent portfolio equality. For example if both companies X and Y share the same fingerprint, namely [3,5,7,3], and have both a portfolio size of 11 patents, then the probability for these portfolios to match perfectly, despite that they have the same fingerprint, is as low as 0.1%=1/1000. While company similarity is not dependent upon absolute equality of company patent portfolios, this example illustrates the limitations of the aggregate approach based on cosine similarity as a measure of similarity. Although the cosine of the angle between the two identical vectors [3,5,7,3] is 0 degrees and, therefore, the similarity measure is 1, the two portfolios are not identical and therefore have an unmeasured, in this instance, degree of similarity/dissimilarity. The above clearly illustrates that aggregated "fingerprint" portfolio views are unreliable measures to draw detailed conclusions about similarity of underlying patent sets.

Figure 23:
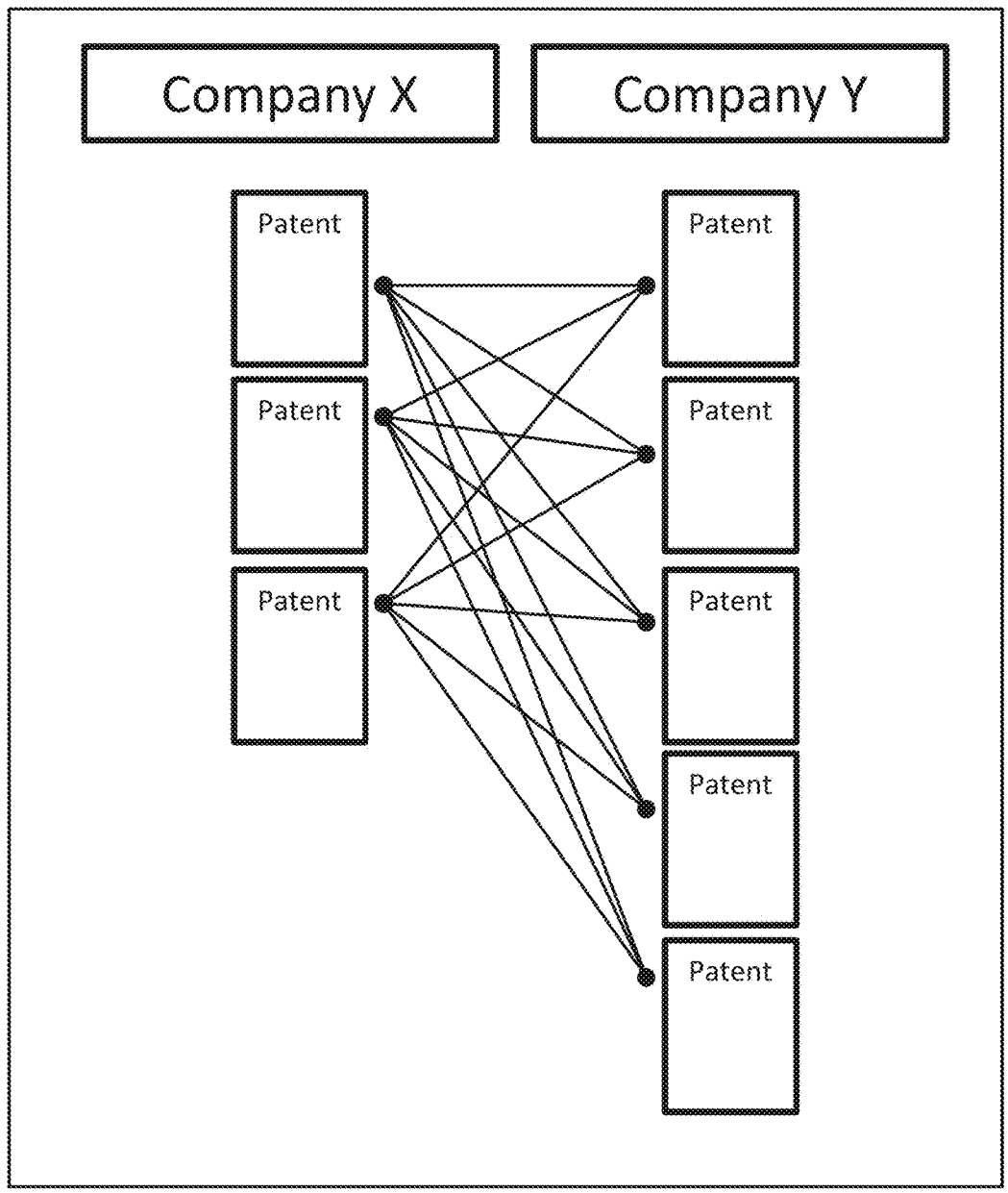
FIG. 23 illustrates one exemplary approach to determining similarity of patent portfolios by skipping an aggregation step and comparing patent portfolios directly.

FIG. 23 illustrates the used approach to determining similarity of patent portfolios by skipping the aggregation step and comparing patent portfolios directly. In this manner, the PDS takes the |X| patents of company X and the |Y| patents of company Y, and compares each pair of patents resulting in |X|*|Y| comparisons (cf. Eq.3). In the previous section the focus was mainly on symmetric peer measures based on aggregated data (e.g., see Eq. 10) which provides a global network view (make clustering and find a ranked list of peers with a specific profile, link clusters to technology areas and observe/predict its evolution in time, etc.) However, symmetric measures do not fully account for the highly relevant sub-activities of a given company (=the activities are a subset of the activities of the query company), or super-activities of a given company (=the activities are a superset of the activities of the query company). The sub-activity and super-activity concepts of peer-hood are inherently asymmetric. From this perspective, the symmetric approach, such as Eq.10, may be seen as a special case where the scores on both the super- and sub-activity scale are very high. On the other hand, asymmetry measures are introduced mainly for pairwise comparison and do require developing additional means to provide a global (network) view. Note that measures for aggregated portfolios can be easily made asymmetric to make pairwise comparison (e.g., see Eq.9), but it still does not help if detailed information on portfolios or patents is needed.

Figures 24, 25:
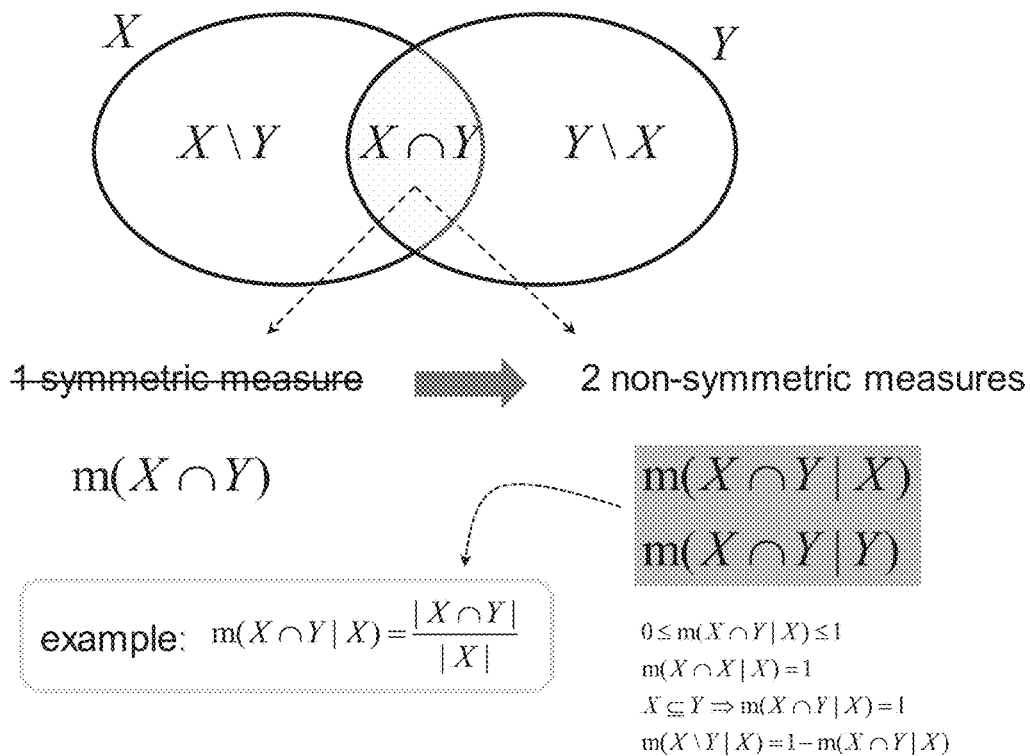
FIG. 24 illustrates an exemplary asymmetric patent portfolio similarity measure approach.
FIG. 25 depicts an exemplary representation of portfolio similarity measures $m(Q \cap P)$ in the context of relationships between activities, subset activities (subactivities) and superset activities (superactivities).

FIG. 24 illustrates the asymmetric patent portfolio similarity measure approach as compared with the symmetric approach (notation: m(X∩Y)). With respect to asymmetric approach, on a high level the system measures how the intersection of two portfolios X and Y relates to X (notation: m(X∩Y|X), and how the intersection of X and Y relates to Y (notation: m(X∩Y|Y). Here, the range of similarity of the intersection of portfolios X and Y as related to X is between 0 and 1. Of course the similarity measure of the intersection of portfolio X as related to portfolio X is 1.

FIG. 25 illustrates an exemplary representation of portfolio similarity measures m(Q∩P) in the context of relationships between activities, subset activities (subactivities) and superset activities (superactivities). In particular the asymmetric similarity measures are in terms of how the intersection of portfolios Q (query company of interest) and P (peer company) relates to Q (notation: m(Q∩P|Q), and how the intersection of portfolios Q and P relates to P (notation: m(Q∩P|P). In this example four sets of activities are represented: equal activity between Q and P; P subactivity of Q; P superactivity of Q; and unrelated activity.

Figure 26:
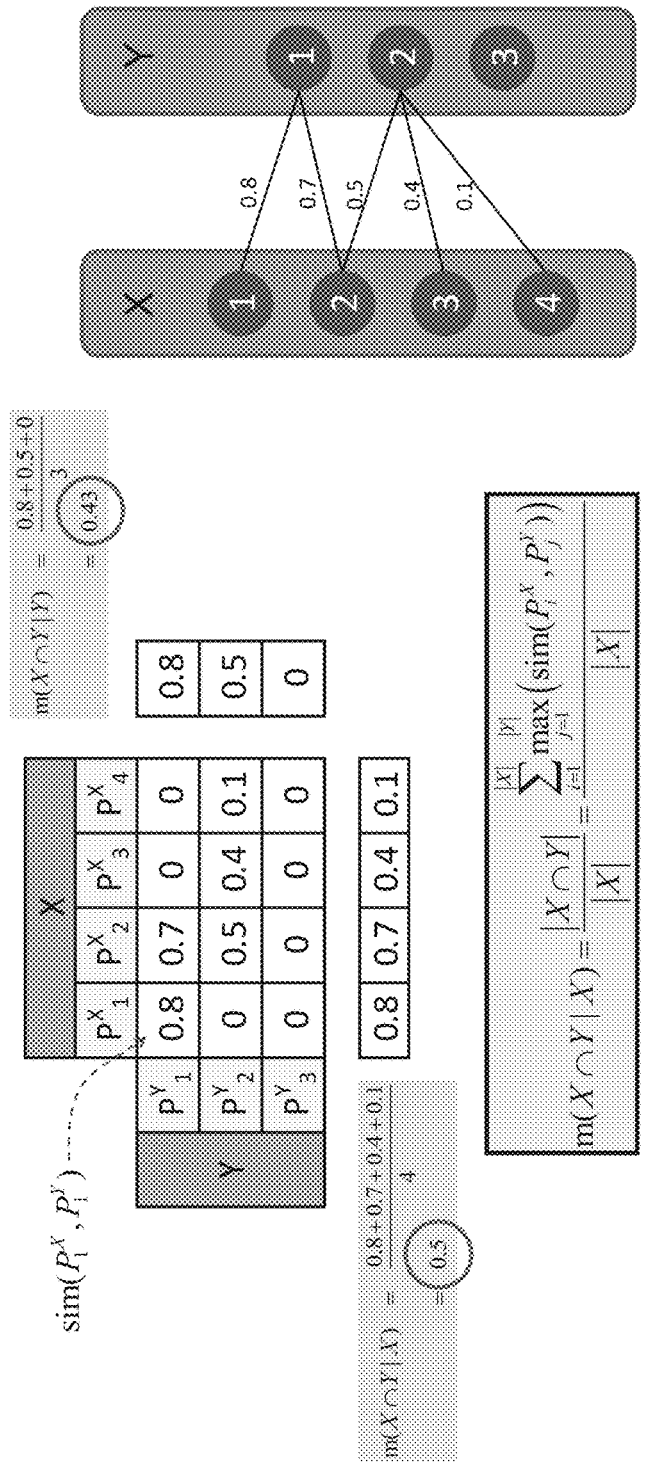
FIG. 26 illustrates an exemplary representation of an asymmetric approach to calculate similarity between portfolio of company X and portfolio of company Y.

FIG. 26 illustrates an exemplary representation of an asymmetric approach to calculate similarity between portfolio of company X ($P^x_{1-4}$) having four patents and portfolio of company Y ($P^y_{1-3}$) having three patents. This measure relies on an underlying patent-based similarity represented as "sim". In this example assume that "sim" always has values in [0,1] and that sim(A,B)=1 in case that A==B.

Figure 27:
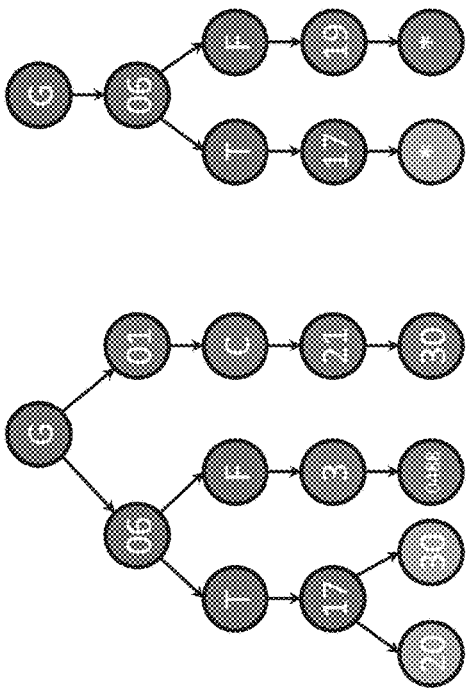
FIG. 27 illustrates an IPC-based patent similarity measure with an exemplary construct for determining patent similarity measures in the context of patent $P_1$ and patent $P_2$ $(sim(P_1,P_2))$ using comparison of IPC code information.

FIG. 27 illustrates an IPC-based patent similarity measure with an exemplary construct for determining patent similarity measures in the context of patent $P_1$ and patent $P_2$ (sim($P_1,P_2$)) using comparison of IPC code information. The primary goal is to represent the IPC codes attached to a given patent in a tree structure according to their natural levels of granularity—in this example as defined by the WIPO (World Intellectual Property Organization). The similarity of two patents ($P_1$, $P_2$) is then defined by the similarity of the IPC code trees, in this example defined as the number of matching truncated IPC codes between patent $P_1$ and $P_2$ divided by the total number of nodes in both trees. For example as shown at FIG. 27 it yields:

$$sim(P_1, P_2) = \frac{\sum_{l=1}^{5} IPC(l, P_1, P_2)}{IPC(5, P_1) + IPC(5, P_2)} \quad \text{(Eq. 23)}$$

where IPC(5, $P_i$) is a number of nodes truncated to level l=5 in patent $P_i$.

Note that sim($P_1,P_2$) at FIG. 27 is symmetric and may be obtained from Eq.6, Eq.11 if we consider only two patents N=2, $\Phi(w_l^{(a)}, w_m^{(b)}, W^{(a)}, W^{(b)})$=1 f(d)=const=1 and $C_{max} = \sum_{i=1}^{N} IPC(h_{max}, P_i)$.

With respect to comparing and examining areas of Peers from a user interface (UI)/user experience (UX) perspective, given the two asymmetric peer measures shown in FIG. 27 it is very difficult to predict what the area of interest of the user will be. Moreover, adding other parameters, e.g., size of portfolio (counted in number of patents), it becomes even more difficult to construct a one-size-fits-all approach. One embodiment designed to overcome this problem is a mechanism where the user can view where the potential peer companies are positioned regarding these measures, e.g., spatially or graphically, and perform selections on the user interface graphs.

Figure 28:
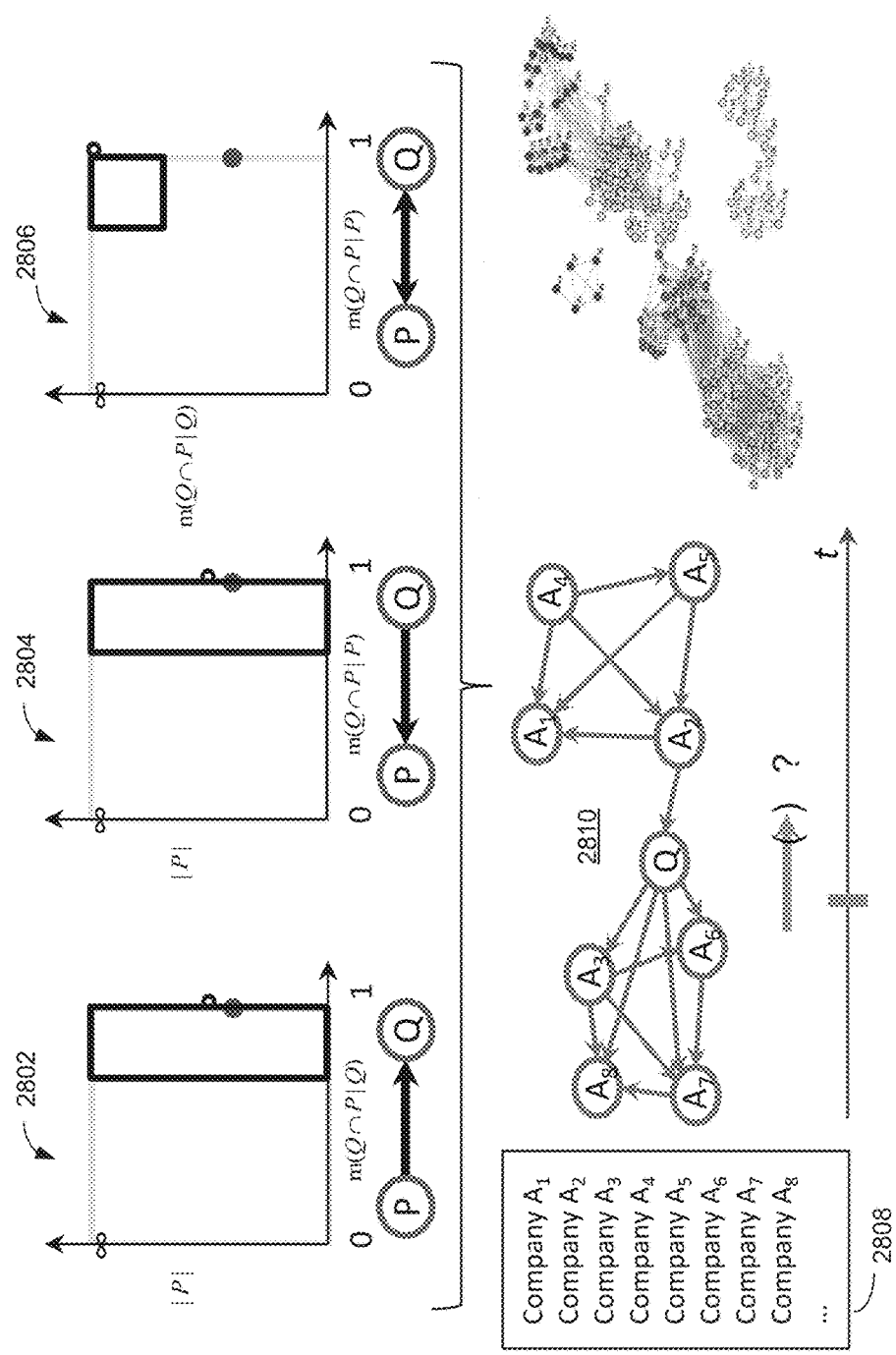
FIG. 28 illustrates, in one exemplary manner, three graphical representations used to support the user in setting thresholds.

FIG. 28 illustrates, in one exemplary manner, three graphical representations used to support the user in setting thresholds: 1) a scatter plot 2802 with each potential peer company in single point, where the X-axis expresses the degree of the peer company P having "super-activity" compared to query company Q and the Y-axis expresses the size of the portfolio measured in number of patents; 2) a scatter plot 2804 with each potential peer company in single point, where the X-axis expresses the degree of the peer company P having "sub-activity" compared to query company Q and the Y-axis expresses the size of the portfolio measured in number of patents; and 3) a scatter plot 2806 with each potential peer company in single point, where the X-axis expresses the degree of the peer company P having "sub-activity" compared to query company Q and the Y-axis expresses the degree of "super-activity."

In this manner the Peer Detection System PDS provides not only the ability to set thresholds and set priorities for certain directions to search for peers, it also gives the user the visual, sensory experience of feeling the "density" of peers for certain values. Once the user makes a selection of peer companies using the plot described above, the selected companies are shown. Next to the traditional list view (i.e., a plain list of peer companies) 2808, the system may show the peer companies (A1-A8), and also the query company (Q), in a graph 2810 that represents the relationships and structure among the peers. The nodes in this graph are the peers, and the edges are the similarities. Important is to note that asymmetric measure as used herein implies that the similarity edges are also asymmetric, meaning that they are directed. It also enables presenting hierarchical structure among peers for user visualization.

Figure 29:
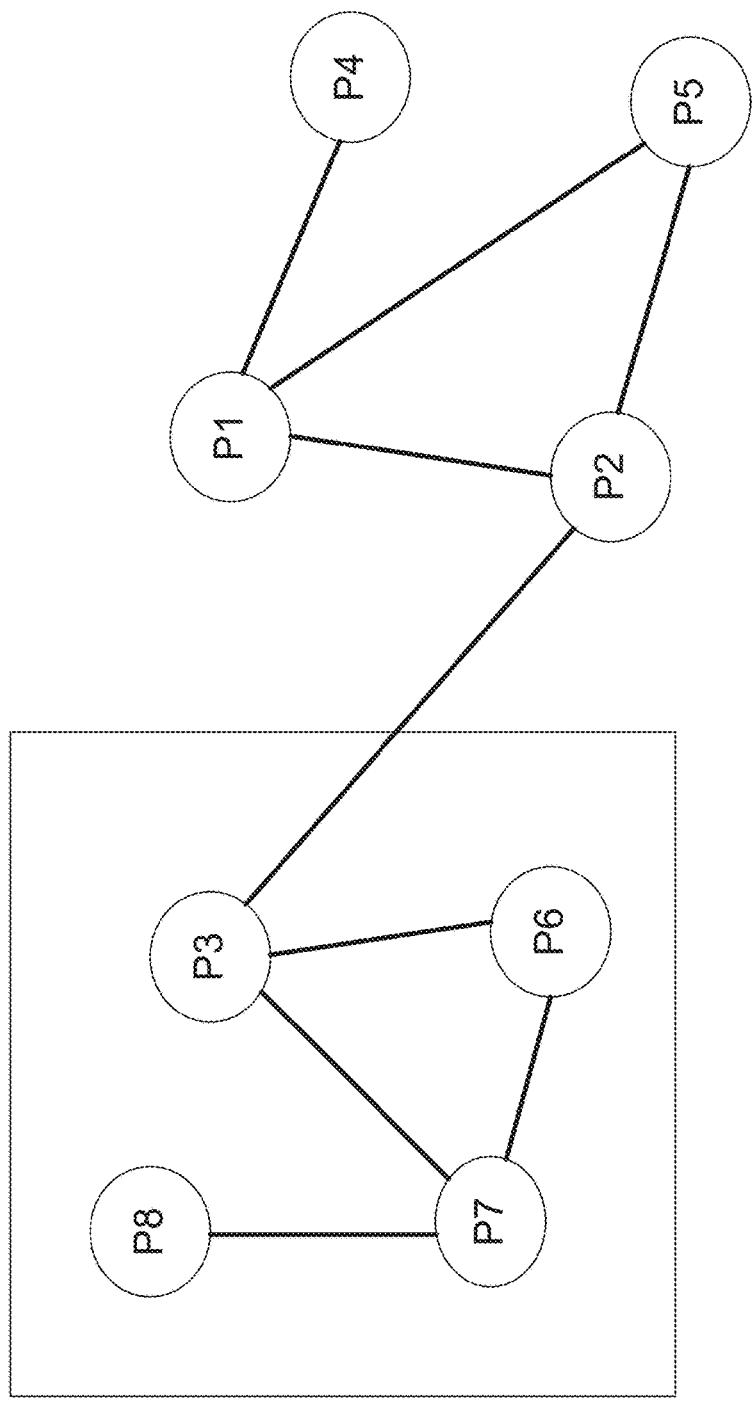
FIG. 29 illustrates an exemplary method of partitioning a patent portfolio by selecting subactivities/superactivities of query company Q.

FIG. 29 illustrates an example of partitioning the patent portfolio by selecting sub/super-activities of the query company Q. As an analogue with representing the peer companies in a graph structure and thereby revealing structure among companies/peers, the system may also represent the patent in the patent portfolio of the query company as a graph. Take as node a patent (P1-P8) and the edges are the similarity between patents ("sim", see above). This approach allows a user to select sub-activities of the query company Q and submit this sub-selection as query, e.g., peer analysis on Q'={$P_3$, $P_6$, $P_7$, $P_8$}. In this example "sim" is symmetric so here the graph is not directed.

Using the approaches described above, a user can use IPC hierarchical structure in patent similarity assessment, compare directly patent portfolios without intermediate aggregation, replace single peer measure by two non-symmetric peer measures (super- and sub-activities), dynamically set threshold on different dimensions with visual feedback, replace/augment peer list by peer graph visualization, revealing structure, use patent structure view to select sub/super activity as query, explore evolution over time, and explore the companies in a specific domain.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A computer-based system for processing a user query to detect a set of peers and generate a graphical representation of detected peers responsive to the query, the system comprising:

a peer detection search engine executed by a computer in communication with at least one database, the peer detection search engine being adapted to receive a peer query and, based at least in part on the peer query, to search at least one corpus of documents contained in the at least one database, the peer detection search engine comprising:

a feature extraction module adapted to extract data from files contained in the at least one corpus of documents, the extracted data related to content associated with documents, the extracted data including a hierarchical set of features and a set of patent features; a portfolio comparison module adapted to:

determine a set of similarity scores for at least a first entity and a second entity based at least in part on an entity digital fingerprint for the first entity based on a first set of the extracted data related to the first entity and an entity digital fingerprint for the second entity based on a second set of the extracted data related to the second entity, the set of similarity scores determined by determining a minimum path distance via root on a taxonomy tree between nodes at one or more hierarchical levels, the set of similarity scores based on a set of weights assigned, respectively, to the hierarchical set of features;

generate a set of feature vectors;

generate a network representation, wherein a degree of relatedness of the first entity and the second entity as peers is determined based in part on a network analysis, the set of feature vectors, and on the entity digital fingerprint for the first entity and the entity digital fingerprint for the second entity;

determine a first set of peer candidates; and generate, for each of the first set of peer candidates, a set of feature scores associated with the set of patent features; and a graphical interface generation module adapted to transform the set of similarity scores, the set of feature scores, and the network representation and generate and present on a remote user display a graphical representation of the transformed set of similarity scores, the set of feature scores, and the network representation for visual perception by a human user associated with the remote user display.

2. The system of claim 1, wherein the portfolio comparison module is adapted to determine the set of similarity scores based on a set of weights assigned, respectively, to the hierarchical set of features.

3. The system of claim 1 further comprises a set of database object files, each object file comprising entity data, extracted data, classification code data, and a set of similarity scores.

4. The system of claim 1, wherein, the portfolio comparison module is further adapted to rank the set of peer candidates based at least in part on the set of feature scores.

5. The system of claim 1, wherein one or more of the set of feature scores is normalized.

6. The system of claim 1, wherein the set of patent features comprises one or more from the group consisting of: fields of a patent; patent title; patent abstract; patent IPC code; patent references; patent claims; rank-c, representing the lowest rank of any claim of a patent in the first set of candidate patents; sim(c,c), representing a highest similarity score between the query and claims in a patent in the first set of candidate patents; sim(c,cs), representing a similarity score between the query and all the claims of a patent in the first set of candidate patents; sim(c,title), representing a similarity score between the query and the title of a patent in the first set of candidate patents; sim(c,abstract), representing a similarity score between the query and the abstract of a patent in the first set of candidate patents; sim(key,key), representing a similarity score between key concepts of the query and a patent in the first set of patents; sim(key,title), representing a similarity score between the key concept of the query and the title of a patent in the first set of patents; sim(key,abstract), representing a similarity score between the key concept of the query and the abstract of a patent in the first set of patents; and IPC-overlap, representing a number of overlapping IPC codes between IPC codes of a patent in the first set of patents and the IPC codes of an initial high-ranking set of patents in the first set of patents.

7. The system of claim 1, wherein the set of patent features includes IPC-overlap, representing the number of the overlapping IPC codes between the IPC codes of a patent in the first set of patent documents, the system further adapted to compute IPCoverlap including code adapted to define the overlap score between two IPC codes, divide each IPC code to a plurality of levels based on IPC code structure, and wherein a first level overlap between two IPC codes results in a first score and a second level overlap between two IPC codes results in a second score.

8. The system of claim 1, wherein the portfolio comparison module is further adapted to determine the set of similarity scores by calculating aggregated code data.

9. The system of claim 1, wherein the portfolio comparison module is further adapted to determine the set of similarity scores based on a number of shared hierarchy levels or a number of shared nodes excluding root.

10. The system of claim 1, wherein the portfolio comparison module is further adapted to determine the set of similarity scores based on stopping computations at a lowest matching level of shared nodes or shared hierarchy levels on a taxonomy tree.

11. The system of claim 1, wherein the portfolio comparison module is further adapted to determine a first set of normalized similarity scores between at least two nodes at a given hierarchy level on a taxonomy tree.

12. The system of claim 1, wherein the portfolio comparison module is further adapted to determine the set of similarity scores based at least in part on a weighted path length from root to node on a taxonomy tree.

13. The system of claim 1, wherein the portfolio comparison module is further adapted to determine portfolio concentration score data representing a measure of an identified company's concentration of resources in one or more technology domains.

14. The system of claim 13, wherein the determined portfolio concentration score data represents a measure of the identified company's activities based on patent classifications.

15. The system of claim 14, wherein the determined portfolio concentration score data is transformed into a two-dimensional company characterization metric.

16. The system of claim 15, wherein the two-dimensional company characterization metric includes a first portfolio concentration metric and a second portfolio volume metric.

17. The system of claim 13, wherein the portfolio comparison module is further adapted to determine a pair-wise similarity between nodes by mapping nodes from a set of portfolios to an underlying classification tree.

18. The system of claim 1, wherein the portfolio comparison module is further adapted to determine a second set of similarity scores by performing a direct comparison of selected portfolio data.

19. The system of claim 18, wherein the portfolio comparison module is further adapted to perform the direct comparison by comparing a first set of patent data associated with a first patent portfolio with a second set of patent data associated with a second patent portfolio.

20. The system of claim 19, wherein at least one of the first patent portfolio and the second patent portfolio are determined based on a prior determined set of similarity scores calculated using a set of patent features.

* * * * *